US012718565B1

(12) United States Patent
Shoshan et al.

(10) Patent No.: US 12,718,565 B1
(45) Date of Patent: Aug. 25, 2026

(54) SYSTEM FOR GENERATION OF RECAP OF LONG VIDEO

(71) Applicant: AMAZON TECHNOLOGIES, INC., Seattle, WA (US)

(72) Inventors: Alon Shoshan, Haifa (IL); Oron Anschel, Bethlehem of Galilee (IL); Emanuel Ben Baruch, Neta (IL); Adam Botach, Haifa (IL); Shunit Haviv Hakimi, Lapid (IL); Igor Kviatkovsky, Haifa (IL); Manoj Aggarwal, Seattle, WA (US); Gerard Guy Medioni, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 19/089,738

(22) Filed: Mar. 25, 2025

(51) Int. Cl.
*G06V 20/40* (2022.01)

(52) U.S. Cl.
CPC .............. *G06V 20/47* (2022.01); *G06V 20/49* (2022.01)

(58) Field of Classification Search
USPC .......................................................... 386/241
See application file for complete search history.

(56) References Cited

U.S. PATENT DOCUMENTS

| | | | | |
|---|---|---|---|---|
| 10,917,704 | B1 * | 2/2021 | Hamid | H04N 21/44008 |
| 2021/0055905 | A1 * | 2/2021 | Moldover | H04N 21/41407 |
| 2021/0090449 | A1 * | 3/2021 | Smith | G06Q 30/02 |
| 2021/0232632 | A1 * | 7/2021 | Howard | G06F 16/211 |

OTHER PUBLICATIONS

"EBU R 128", Wikipédia, 6 pages. Retrieved from the Internet: URL: https://en.wikipedia.org/wiki/EBU_R_128.
Bain, et al., "WhisperX: Automatic Speech Recognition with Word-level Timestamps (& Diarization)", GitHub, 2023, 8 pgs. Retrieved from the Internet: URL: https://github.com/m-bain/whisperX.
Qin, et al., "Large Language Models are Effective Text Rankers with Pairwise Ranking Prompting", Mar. 28, 2024, 30 pgs. Retrieved from the Internet: URL: https://arxiv.org/abs/2306.17563.
Tang, et al., "Found in the Middle: Permutation Self-Consistency Improves Listwise Ranking in Large Language Models", Apr. 22, 2024, 14 pgs. Retrieved from the Internet: URL: https://arxiv.org/abs/2310.07712.

* cited by examiner

*Primary Examiner* — Nigar Chowdhury
(74) *Attorney, Agent, or Firm* — NICHOLSON DE VOS WEBSTER & ELLIOTT LLP

(57) ABSTRACT

Input data comprising video and associated audio is processed to generate recap data, such as video with audio that summarizes previous occurrence and entices a viewer. The input data is processed to generate dense text data that includes timestamps, dialogue, descriptions of scenes of the video, and so forth. The input data is also processed to generate summary data, such as scene, episode, and season summaries. A set of one or more machine learning (ML) systems use this as input to generate a narration script. Narration audio is generated from the narration script. The narration script is then used to generate sections of a recap such as an intro, teaser, detail, and outro. Each portion may include narration audio, clips of video, video clips of relevant dialog, background music, audio effects, and so forth. The duration of elements may be constrained based on the presentation of associated narration audio.

20 Claims, 11 Drawing Sheets

SYSTEM FOR GENERATION OF RECAP OF LONG VIDEO

BACKGROUND

Content such as video which includes associated audio may be very long in duration. For example, a television series may have several seasons of many episodes, each episode having many scenes.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
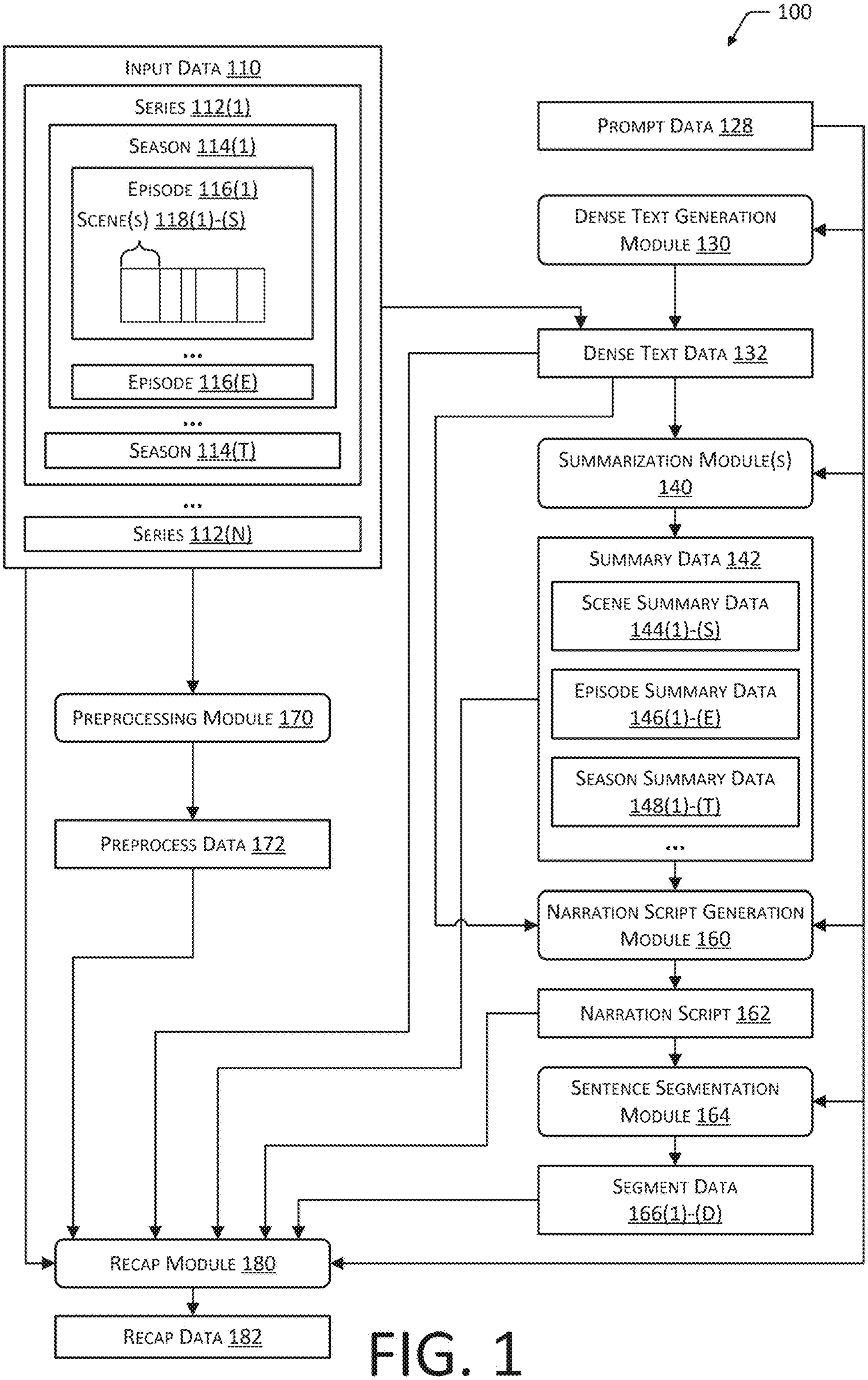
FIG. 1 illustrates a system that accepts input data and generates recap data comprising an audio and video recap of the input data, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Content comprising video is a compelling and highly effective mechanism for sharing information. Video may be used to convey technical information, for education, to entertain, to document, and so forth. Individual instances of video may have durations that are minutes or hours long. These individual instances may be part of a larger whole. For example, a television series may have several seasons, each season being made up of many episodes, and each episode being made up of many scenes.

Improved techniques and technology associated with video production, the prevalence of cameras, availability of services that allow distribution of video-on-demand, and other factors have resulted in a rapid expansion in the amount of video that is produced and is available. This abundance of video results in several challenges.

Different viewers may consume the video in different ways. Video-on-demand and other distribution mechanisms allow a user to randomly access any point. One situation arises when users "binge" by viewing a contiguous portion of the video such as a season of episodes in a relatively short span, such as a few days. However, it may be many months or even years before a new season is available. As a result, it may be desired to provide the user with a recap that helps to refresh the user's memory of the preceding content. This recap may provide a reminder of the preceding content, including major plot points, characters, and so forth.

Another situation arises when users begin viewing content at some point other than the beginning. For example, user "Alice" may wish to begin watching a popular television series starting with the most recent episode of season four, while user "Bob" may wish to start watching the same television series beginning with season two. Each would benefit from a recap that provides them with the context and characters up to the respective points in the content.

To facilitate these and other situations, different recap videos would ideally be created and available, each providing an appropriate summary up to various points in the content. Unfortunately, the manual creation of such recaps that accommodate various points, such as multiple seasons or even individual episodes, would be infeasibly expensive and time intensive to generate manually. The difficulties and cost associated are further magnified when the large catalog of previously created content is taken into account, such as hundreds or thousands of different television shows.

Described in this disclosure are techniques and systems for generating recap data comprising video and audio that, when presented, provides a summary of preceding instances of content. The recap data presents clips (short segments) of video and sound that provide a summary up to a specified point in input data. The recap data may include portions such as an intro, teaser, details, and outro. The recap data may include video of portions of the input data that are deemed to be significant, that present specific dialog, and so forth.

The techniques and systems described in this disclosure use one or more machine learning (ML) models. The ML model(s) described in this disclosure may comprise large language models (LLMs), multimodal LLMs (MLLMs), generative pre-trained transformer (GPT) models, diffusion models, foundation models, and so forth. In some implementations a model may be considered an ensemble or composite of multiple models. These models comprise instructions that execute on one or more computing devices. A "prompt" comprises an input that may be provided to an ML model that describes a task that the ML model is to perform. The prompt may be expressed as natural language text. The prompt may include a description of a task, constraints on output from the task, examples of output from the task, and so forth. During operation, the system may utilize the same ML model, or may utilize different ML models for different operations.

Summary data and prompts are provided as input to one or more ML models to generate a narration script. The narration script is then used to generate narration audio. The narration script and prompts are provided as input to one or more ML models to generate segment data indicative of segments of the narration script, each segment being associated with a particular portion of dialog, action, event, and so forth. The segment data, input data, and one or more prompts are provided as input to one or more ML models to generate the portions such as intro, teaser, details, and outro. Also determined is audio, such as the narration audio, extracted audio from the input data, audio effects, background music, and so forth. These portions and the audio are then combined to create the recap data.

The recap data may then be available for presentation to a user. For example, a user may request to view the recap data. In another example, the recap data may be automatically presented before presentation of a specified portion of input data. Continuing the example, before playing the first episode of season 2, the recap data that summarizes season 1 may be presented.

While these techniques and systems are described with regard to scenes, episodes, and seasons, it is understood that they may be applied to other subdivisions of input data. For example, recap data may be generated that corresponds to set time intervals of video such as every 60 minutes, every hour, every day, every month, every year, and so forth. The video or other input data may be fiction, non-fiction, archival, observational, and so forth. In another example, recap data may be provided based on events associated with the video, such as to summarize the video until the introduction of a specified character or occurrence of a specified event.

The system and techniques described in this disclosure allow for the automated ability to generate high quality, relevant, and appealing recaps that include video and audio elements. The resulting recap data may be generated for specific portions of the input data. For example, recap data may be generated that recaps a single season, recaps all preceding seasons, recaps all preceding episodes, and so forth. This allows highly relevant recap data to be made available, improving the user experience in consuming content.

Illustrative System

FIG. 1 illustrates a system 100 that accepts input data 110 and generates recap data 182 comprising an audio and video recap of at least a portion of the input data 110, according to some implementations. The system 100 may be implemented as one or more computing devices that include general central processing units (CPUs), graphic processing units (GPUs), and so forth.

The input data may comprise video with associated audio and other information. A library of input data 110 may include many series 112(1), 112(2), . . . , 112(N). An entire series 112 of content, such as a single television show, may have multiple seasons 114(1), 114(2), . . . , 114(T). Each season 114 may comprise one or more episodes 116(1), 116(2), . . . , 116(E). Each episode 116 may comprise one or more scenes 118(1), 118(2), . . . , 118(S). Each scene 118 may comprise a portion of the input data 110 that is associated with a contiguous interval of time. In some circumstances, a scene 118 may be associated with a particular location or setting that may be associated with a particular purpose. Each scene 118 may comprise one or more shots. Each shot may comprise video that was acquired, or appears to have been acquired, continuously using a single camera.

While the input data 110 is described with regard to the hierarchical structure of series, season, episode, and scene, it is understood that other structures or dividing methodologies may be applied. For example, a "universe" may comprise two or more series 112. In another example, a series may be divided based on the presentation of particular events or characters. The input data 110 may be works of fiction, non-fiction, archival, observational, and so forth.

The input data 110 is provided to a dense text generation module (DTGM) 130 that determines dense text data (DTD) 132 as output. In one implementation, each instance of DTD 132 may be associated with a respective scene 118. In other implementations, an instance of DTD 132 may be associated with a conversational turn, specified interval of time, or other portion of the input data 110.

The DTD 132 is "dense" in the sense that it includes substantive text data about its associated portion of the input data 110. The DTD 132 may comprise one or more of time data such as timestamps, text of dialogue with associated speaker annotation indicative of the character speaking, descriptive text providing a description, or other information. During operation, the DTGM 130 may generate speaker annotations that are not otherwise provided, and then assess these speaker annotations to determine if any are invalid. Correction data is then generated that addresses the invalidity, and is then used to update the speaker annotations. The DTD 132 may comprise additional markup tags. For example, the DTD 132 may utilize extensible markup language (XML) tags to convey information.

The time data in the DTD 132 may include a scene begin time indicating when a scene starts and a scene end time indicating when the scene ends, and detail time that indicates when particular actions, events, or other occurrences take place. For example, detail time may be indicative of a time of occurrence, with regard to the input data 110, of an appearance of a character, a piece of dialog, an action, an event, a specific location, appearance of an object, and so forth.

The descriptive text may describe one or more actions occurring within the scene 118, describe a setting of the scene 118, or other information associated with the scene 118. The description of the setting may be indicative of one or more of a specific location of the scene 118 such as "Amrit's apartment", a category of location of the scene 118 such as "urban alley between high rise buildings", lighting of the scene 118 such as "dimly lit", weather in the scene 118 such as "clear and cold", condition of one or more objects or characters in the scene 118 such as "a well worn jacket", characters who are depicted within the scene 118, characters who are referenced but not present within the scene 118, and so forth.

The DTGM 130 may utilize one or more machine learning (ML) models to determine the DTD 132. During operation of the system 100, in addition to the input data 110, the DTGM 130 may accept as input one or more prompts, such as stored as prompt data 128. The prompt data 128 may comprise prompts that, when provided to an ML model, instruct the ML model to perform a particular task. The prompts may include examples as to the desired output of the task. The prompts may be expressed using a natural language. For example, the prompt may be expressed in American English and describe the task and desired output. The DTGM 130 may use the same or different ML models as used in the subsequent modules.

The input data 110 may be provided to a preprocessing module (PPM) 170 that determines preprocess data 172 as output. The preprocess data 172 may comprise time data indicative of shot boundaries such as a starting time and an ending time for a given shot, speaker detection indicative of a starting time and an ending time for an instance of dialog, or other information. In one implementation, one or more operations associated with the PPM 170 may be performed by the DTGM 130 or another module. In some implementations the DTD 132 may include the preprocess data 172. For example, the DTD 132 may include data indicative of shots, indicate starting time and ending times for those shots, and so forth.

The DTD 132 is provided as input to one or more summarization modules 140. Based on this input, the summarization modules 140 generate one or more instances of summary data 142. The summary data 142 may comprise text, vector data, or other information. The summarization modules 140 may comprise one or more ML models. During operation of the system 100, in addition to the DTD 132, the summarization modules 140 may accept as input one or more prompts, such as stored as prompt data 128. The prompt data 128 may comprise prompts that, when provided to an ML model, instruct the ML model to perform a particular task. The prompts may include examples as to the desired output of the task. The prompts may be expressed using a natural language.

The summary data 142 may comprise scene summary data 144, episode summary data 146, or season summary data 148. Each instance of scene summary data 144(1)-(S) provides a textual summary of its associated scene 118. A set of the scene summary data 144 that is associated with an episode 116 is provided as input to the one or more summarization modules 140. Based on this input, the one or more summarization modules 140 generate episode summary data 146. During operation of the system 100, in addition to the set of the scene summary data 144, the one or more summarization modules 140 may accept as input one or more prompts, such as stored as prompt data 128. The prompt data 128 may comprise prompts that, when provided to an ML model, instruct the ML model to perform a particular task. The prompts may include examples as to the desired output of the task. The prompts may be expressed using a natural language.

Each instance of episode summary data 146 provides a textual summary of its associated episode 116. During operation, the one or more summarization modules 140 may assess instances of episode summary data 146 to determine if they contain any errors, such as plot gaps. Correction data is then generated that addresses these errors, and the correction data is then used to update the episode summary data 146. The one or more summarization modules 140 may use the same or different ML models as used in other modules.

A set of the episode summary data 146 that is associated with a season 114 is provided as input to one or more summarization modules 140. Based on this input, the one or more summarization modules 140 determine overall season data. The overall season data may comprise one or more of character profile data or season outline data. The character profile data may be indicative of one or more occurrences that are associated with respective characters that occur during the season 114 of the input data 110 that is provided in the episode summary data 146(1)-(E). The season outline data may comprise an outline of events during the season 114 of the input data 110 that is provided in the episode summary data 146(1)-(E). The one or more summarization modules 140 then use the overall season data and the set of episode summary data 146 to generate the season summary data 148(1)-(T). Each instance of season summary data 148 provides a textual summary of its associated season 114. The overall season data provides context and information that, when provided as input to the one or more summarization modules 140 in the subsequent operations, improves the accuracy of the resulting season summary data 148.

During operation of the system 100, in addition to the set of the episode summary data 146, the one or more summarization modules 140 may accept as input one or more prompts, such as stored as prompt data 128. The prompt data 128 may comprise prompts that, when provided to an ML model, instruct the ML model to perform a particular task. The prompts may include examples as to the desired output of the task. The prompts may be expressed using a natural language.

During operation, the one or more summarization modules 140 may assess instances of season summary data 148 to determine if they contain categorical errors. Correction data is then generated that addresses these categorical errors, and the correction data is then used to update the season summary data 148. The one or more summarization modules 140 may use the same or different ML models as used in other modules.

In some implementations the summary data 142, or a portion thereof, may be created by a human operator.

The summary data 142 to a specified point with regard to the input data 110, and one or more prompts are provided as input to a narration script generation module (NSGM) 160. Based on this input, the NSGM 160 generates a narration script 162. The narration script 162 comprises text data. The narration script 162 may comprise natural language sentences, such as suitable for a human to read. In some implementations the narration script 162 may include or be associated with additional data, such as data indicative of sound effects or scenes.

In some implementations, once the narration script 162 has been generated, it may be unchanged during the remainder of the processing described. For example, the dialog of the narration script 162 may be fixed before subsequent processing, such as by a sentence segmentation module 164, recap module 180, and so forth.

As used in this disclosure, the summary and associated recap data 182 is associated with content up to a specified point in the input data 110. The specified point may be indicative of a specified elapsed time in the input data 110, endpoint of a specified portion of the input data such as an end of an episode 116 or season 114, and so forth.

The narration script 162 and one or more prompts are provided as input to a sentence segmentation module (SSM) 164. Based on this input, the SSM 164 generates segment data 166(1)-(D). A segment of the segment data 166 may comprise a portion of the text of the narration script 162 that is associated with a particular scene 118, event, action, character, shot, or combination thereof. A segment may comprise a portion of a sentence in the narration script 162. In some implementations, the one or more prompts may include examples of narration script sentences and corresponding examples of segments.

The preprocess data 172, DTD 132, summary data 142, the narration script 162, the segment data 166, and one or more prompts may be provided as input to a recap module 180. Based on this input, the recap module 180 generates recap data 182. In implementations in which the input data 110 comprises video and associated audio, the recap data 182 may also comprise video and associated audio. Operation of the recap module 180 is discussed in more detail with regard to FIG. 2.

Once generated, the recap data 182 may be stored and then provided for subsequent presentation. For example, a user may be presented with the recap data 182 based on their specified selection of content to view.

As used in this disclosure a module may comprise one or more ML models that process one or more inputs responsive to one or more prompts, such as specified by the prompt data 128. Modules are described with respect to the operations they perform for ease of illustration and not necessarily as a limitation. For example, the operations associated with one or more modules may be performed by a single ML model that operates on different inputs and using different prompts that direct the single ML model to perform a particular task. The one or more ML models comprise computer-executable instructions executing on one or more hardware processors.

Figure 2:
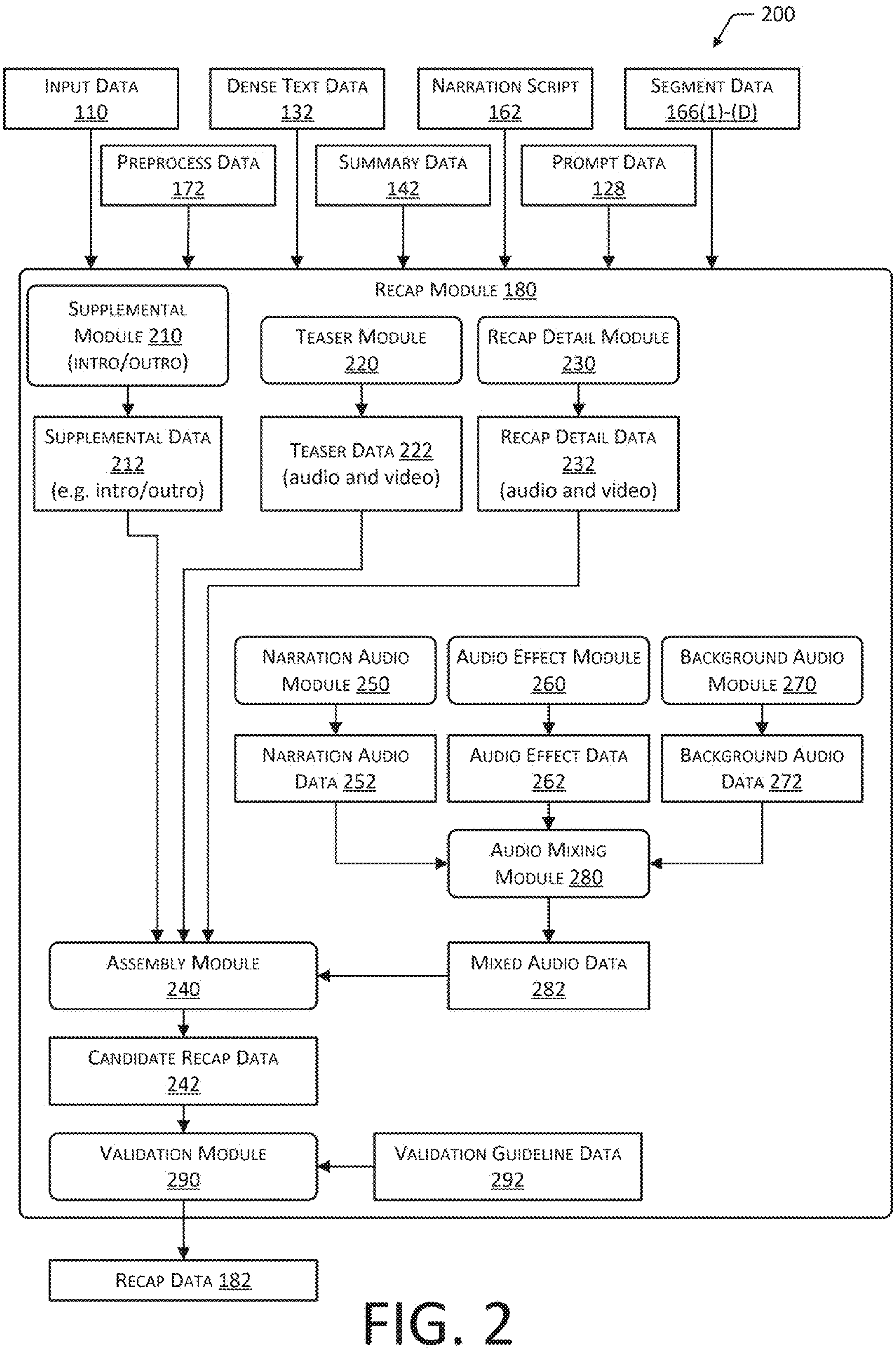
FIG. 2 illustrates a recap module of the system that generates the recap data, according to some implementations.

FIG. 2 illustrates at 200 a recap module 180 of the system 100 that generates the recap data 182, according to some implementations.

The recap module 180 may accept as input one or more of the input data 110, the DTD 132, the narration script 162, the segment data 166, the preprocess data 172, the summary data 142, or the prompt data 128.

The recap module 180 may comprise a supplemental module 210, a teaser module 220, a recap detail module 230, a narration audio module 250, an audio effect module 260, a background audio module 270, an audio mixing module 280, an assembly module 240, a validation module 290, or other modules. During operation, these modules may utilize one or more of the inputs to generate their respective outputs. In some implementations, the modules may utilize additional inputs, such as described below with regard to their operation. The operation of these modules is associated with input data 110 up to the specified point that the resulting recap data 182 is associated with.

The supplemental module 210 generates supplemental data 212. The supplemental data 212 may comprise one or more of an introductory portion ("intro") or a concluding portion ("outro"). The intro provides a brief presentation about the input data 110 to the specified point. The intro may be used to set the stage for the recap, illustrating a particular mood and one or more main themes. The outro provides a brief conclusion to the recap, such as establishing an exciting mood that encourages the viewer to watch the next installment of the input data 110. Operation of the supplemental module 210 is discussed in more detail with regard to FIG. 3. The supplemental data 212 may include carefully timed audio effects, such as insertion of a "cinematic boom" audio effect at specified moments to heighten perceived tension by the viewer.

The teaser module 220 generates teaser data 222. The teaser data 222 is a rhythmic demonstration using instances of video, such as shots, that may be selected to encourage the viewer to continue watching. For example, the teaser data 222 may comprise shots that are associated with critical moments in the input data 110 to the specified point. Operation of the teaser module 220 is discussed in more detail with regard to FIG. 4.

The recap detail module 230 generates recap detail data 232. The recap detail data 232 may comprise clips of selected video, and may include clips of video that present specified instances of dialog. The recap detail data 232 may comprise the body or majority portion, with respect to duration, of the recap data 182. Operation of the recap detail module 230 is discussed in more detail with regard to FIG. 5.

The recap data 182 may include associated audio. This audio may include narration, added sound effects, sounds extracted from the input data 110, background music, and so forth.

The narration audio module 250 generates narration audio data 252. In one implementation, the narration audio module 250 may comprise a text to speech system that accepts the narration script 162 as input and provides as output narration audio data 252. In another implementation, the narration audio data 252 may be a recording of a human speaker. In yet another implementation the narration audio data 252 may be computer-generated audio that is based on one or more samples of a human speaker. For example, a voice actor may consent to generation of a computer-generated rendition of their performance.

The duration of the recap data 182 may be based on the duration of the narration audio data 252. For example, an overall duration of the recap data 182 may be the sum of the duration of the narration audio data 252, the duration of any inserted instances of video that include dialog, and an introductory interval and a concluding interval that includes no dialog but may contain background music or audio effects.

The audio effect module 260 generates audio effect data 262. The audio effect data 262 may comprise clips of selected audio, library audio data retrieved from a library of audio effects, and so forth. Operation of the audio effect module 260 is discussed in more detail with regard to FIG. 10.

The background audio module 270 provides as output background audio data 272. The background audio data 272 may have a duration that is based on the duration of the narration audio data 252. For example, the background audio data 272 may have a duration that is equal to a sum of the duration of the narration audio data 252, and introductory and concluding intervals that contain no dialog. The background audio module 270 may retrieve previously composed music files. The music files may comprise Standard MIDI Files (SMF) that provide time-stamped instructions that direct a corresponding and compatible Musical Instrument Digital Interface (MIDI) device to provide audio output. The music files may also comprise an audio file format, such as WAV, MPEG-4, Free Lossless Audio Codec (FLAC), and so forth that provides a digital representation of audio data. The background audio module 270 may utilize various techniques to adjust one or more characteristics of the resulting background audio data 272. For example, timing of the instructions in the SMF may be changed to speed up or slow down presentation, changing the overall duration of the background audio data 272. In another example, one or more portions of a source audio file may be duplicated, or duplicative portions removed, to increase or decrease the duration of the background audio data 272. Continuing this example, a particular musical bar or set of bars may be repeated to increase the overall duration, or may be reduced to a single measure to shorten the overall duration.

The audio mixing module 280 accepts as input various audio elements, which may be represented as audio tracks, and combines them to provide mixed audio data 282 as output. For example, the audio mixing module 280 may accept as input the narration audio data 252, the audio effect data 262, and the background audio data 272. The audio mixing module 280 may utilize a loudness normalization algorithm. For example, a normalization algorithm implementing the "R 128" standard as promulgated by the European Broadcasting Union may be used to normalize loudness in the resulting mixed audio data 282. The normalization algorithm may be applied to each of the inputs separately, to ensure that they are equally weighted in the final mixed audio data 282.

The audio mixing module 280 may also implement an audio ducking algorithm, in which the loudness of one track is less than the loudness of another. For example, the loudness of the background audio data 272 may be reduced compared to that of the narration audio data 252 to improve the listener's ability to discern the speech of the narration.

The assembly module 240 accepts as input the various elements and combines them to produce candidate recap data 242. For example, the assembly module 240 may use as input a plurality of elements including first supplemental data 212(1) that provides the intro, the teaser data 222, the recap detail data 232, and second supplemental data 212(2) that provides the outro. It is understood that in some implementations the recap data 182 may omit one or more of these elements. For example, the system 100 may generate recap data 182 that omits the teaser data 222.

In one implementation the assembly module 240 may comprise one or more ML models that accept the elements and one or more prompts as input and generates the candidate recap data 242. In another implementation the assembly module 240 may concatenate the inputs in a predetermined fashion.

The validation module 290 accepts one or more instances of candidate recap data 242 and, based on validation guideline data 292, determines if the candidate recap data 242 is suitable. The validation module 290 may comprise one or more ML models that accept the candidate recap data 242, the validation guideline data 292, and one or more prompts as input and generate validation data indicative of whether the candidate recap data 242 is deemed to satisfy the validation guideline data 292.

The validation guideline data 292 may comprise one or more validation guidelines indicative of one or more of specified production standards, overall duration, maturity rating, legal compliance requirements, and so forth. For example, production standards may indicate a maximum number of different portions of video (or "cuts") that are permitted per unit time such as every 10 seconds to avoid producing output that is disconcertingly abrupt to a viewer. In another example, production standards may specify a maximum percentage of the recap data 182 that is permitted to be dialog from the input data 110.

An instance of candidate recap data 242 that is determined by the validation module 290 to comply with the validation guidelines specified in the validation guideline data 292 may be designated as the recap data 182.

In some implementations the validation module 290 may validate portions before assembly by the assembly module 240. For example, the validation module 290 may validate instances of supplemental data 212, teaser data 222, recap detail data 232, and so forth.

Figure 3:
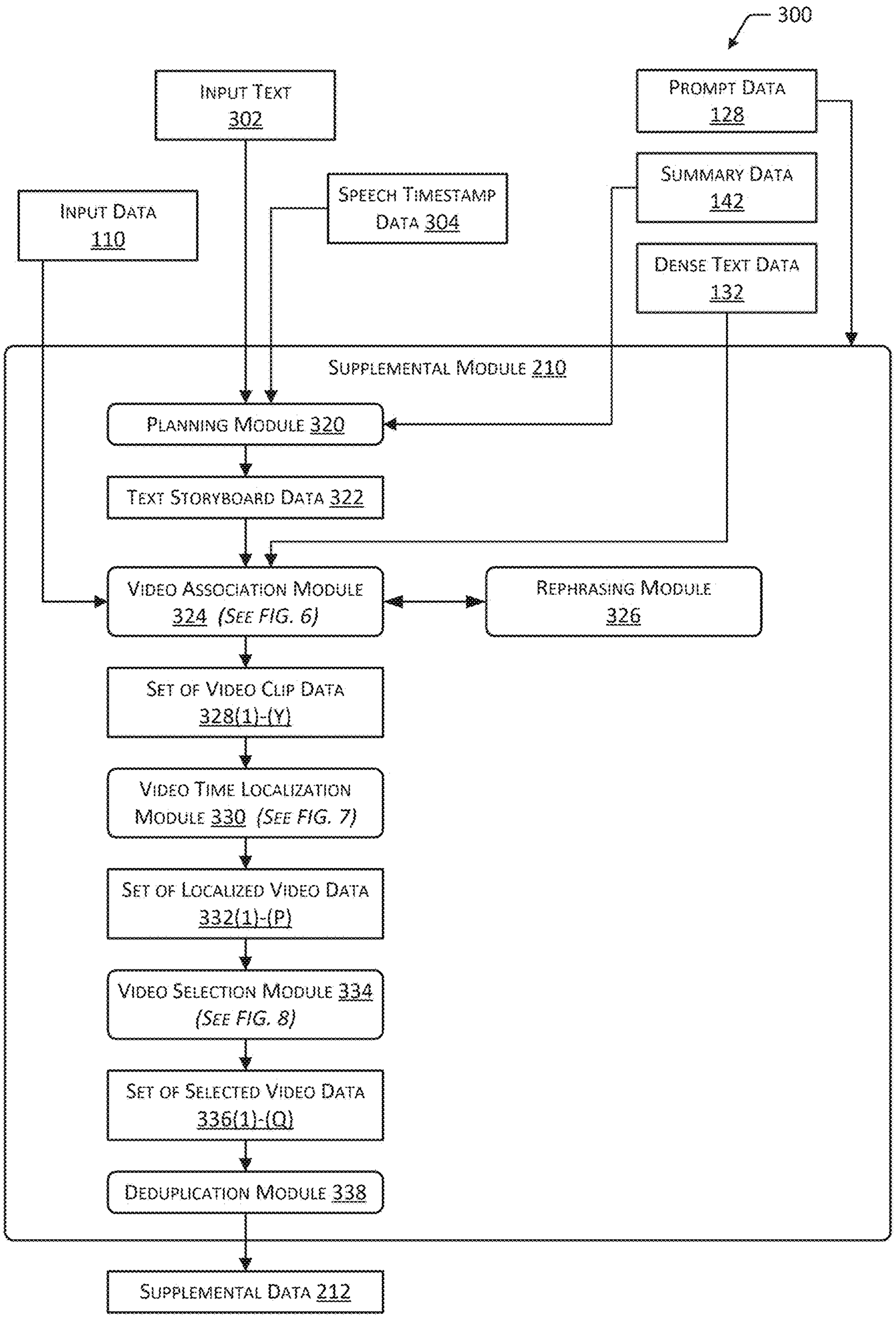
FIG. 3 illustrates a supplemental module that accepts input data and generates supplemental data such as an intro portion and an outro portion of the recap data, according to some implementations.

FIG. 3 illustrates at 300 the supplemental module 210 that accepts input data 110 and generates supplemental data 212 such as an intro portion and an outro portion of the recap data 182, according to some implementations.

The supplemental module 210 may comprise a planning module 320, a video association module 324, a rephrasing module 326, a video time localization module 330, a video selection module 334, and a deduplication module 338.

The planning module 320 accepts as input the summary data 142, speech timestamp data 304, input text 302, and one or more prompts such as provided by prompt data 128. The summary data 142 may comprise episode summary data 146 for one or more episodes 116 to the specified point of the input data 110. The speech timestamp data 304 may comprise information as to when particular words are spoken in the portion that is being generated, such as the intro or outro. The speech timestamp data 304 may be determined by processing the narration audio data 252 to determine when particular words are spoken, when the intro text or outro text is being spoken, and so forth. The input text 302 comprises information such as an indication as to whether the supplemental data 212 being generated is an intro or an outro, a portion of the narration script 162 that is associated with that intro or outro, and so forth.

During operation, the planning module 320 is prompted to generate text storyboard data 322 based on the inputs. The text storyboard data 322 comprises a textual story board that describes time intervals and descriptions that are associated with those time intervals. For example, the text storyboard data 322 may be "{time=00.00-02.00} Aerial shot of Los Angeles at night showing size of the city. {time=02.01-4.00} Wide shot of the Mojave Desert emphasizing the vast emptiness of the desert. {time=04.01-06.50} Close-up of Alice's face, looking determined."

The video association module 324 accepts as input the text storyboard data 322, the input data 110, the DTD 132, and one or more prompts such as provided by the prompt data 128. During operation, the video association module 324 is prompted to generate a set of video clip data 328(1)-(Y), with video clips that are representative of the descriptions in the text storyboard data 322. For example, the video association module 324 may attempt to find portions of the input data 110 that have DTD 132 that corresponds to the description in the text storyboard data 322. A rephrasing module 326 may be used to rephrase the descriptions in the text storyboard data 322 and generate candidate descriptions. These candidate descriptions may then be provided to the video association module 324 and used to determine the set of video clip data 328(1)-(Y). As a result, each description in the text storyboard data 322 may be associated with a plurality of instances of video clip data. Some of these instances may be duplicative, and such deduplication may be addressed elsewhere in the process, such as by the deduplication module 338. Operation of the video association module 324 is discussed in more detail with regard to FIG. 6.

The set of video clip data 328(1)-(Y) comprises instances of video that may be relatively long in duration. The timing data in the DTD 132 that is used to find instances of video clip data may be relatively coarse, such as resolving to about 5 seconds. The instances of video may include portions that are not directly relevant to the description in the text storyboard data 322. For example, video clip data may include a shot that pans from the ocean then towards the city of Los Angeles, having a duration of 15 seconds. As a result, the instances of video clip data in the set of video clip data 328(1)-(Y) may be longer than necessary to satisfy the description in the text storyboard data 322.

The video time localization module 330 accepts as input the set of video clip data 328(1)-(Y) and one or more prompts such as provided by the prompt data 128. During operation, the video time localization module 330 is prompted to generate a set of localized video data 332(1)-(P). Each instance of localized video data is representative of a corresponding description in the text storyboard data 322, and may exhibit a duration that is less than its corresponding instance of video clip data that was provided as input. The video time localization module 330 may be considered to perform a time cropping function, resulting in time localized video that is highly relevant to the associated description. Operation of the video time localization module 330 is discussed in more detail with regard to FIG. 7.

The video selection module 334 accepts as input the set of localized video data 332(1)-(P) and one or more prompts such as provided by the prompt data 128. During operation, the video selection module 334 is prompted to select, from the inputs, a set of selected video data 336(1)-(Q). Each instance of selected video data is representative of a corresponding description in the text storyboard data 322. In some situations, duplicative instances of selected video data may be present in the set of selected video data 336(1)-(Q). These may be exact duplicates, or may comprise instances that overlap in time or otherwise present the same or substantially the same video. Operation of the video selection module 334 is discussed in more detail with regard to FIG. 8.

The deduplication module 338 accepts as input the set of selected video data 336(1)-(Q) and one or more prompts such as provided by the prompt data 128. During operation, the deduplication module 338 is prompted to generate supplemental data 212 that does not include duplicative instances of video. The deduplication module 338 may remove exact duplicates, or may remove instances that overlap in time or otherwise present the same or substantially the same video. For example, a first instance of video may be associated with time 19.10-19.17 and a second instance may be associated with time 19.09-19.15. This may be deemed to be substantially the same, and one of these instances may be removed. The remaining non-duplicative instances of the set of selected video data 336 are then used to generate the supplemental data 212.

Figure 4:
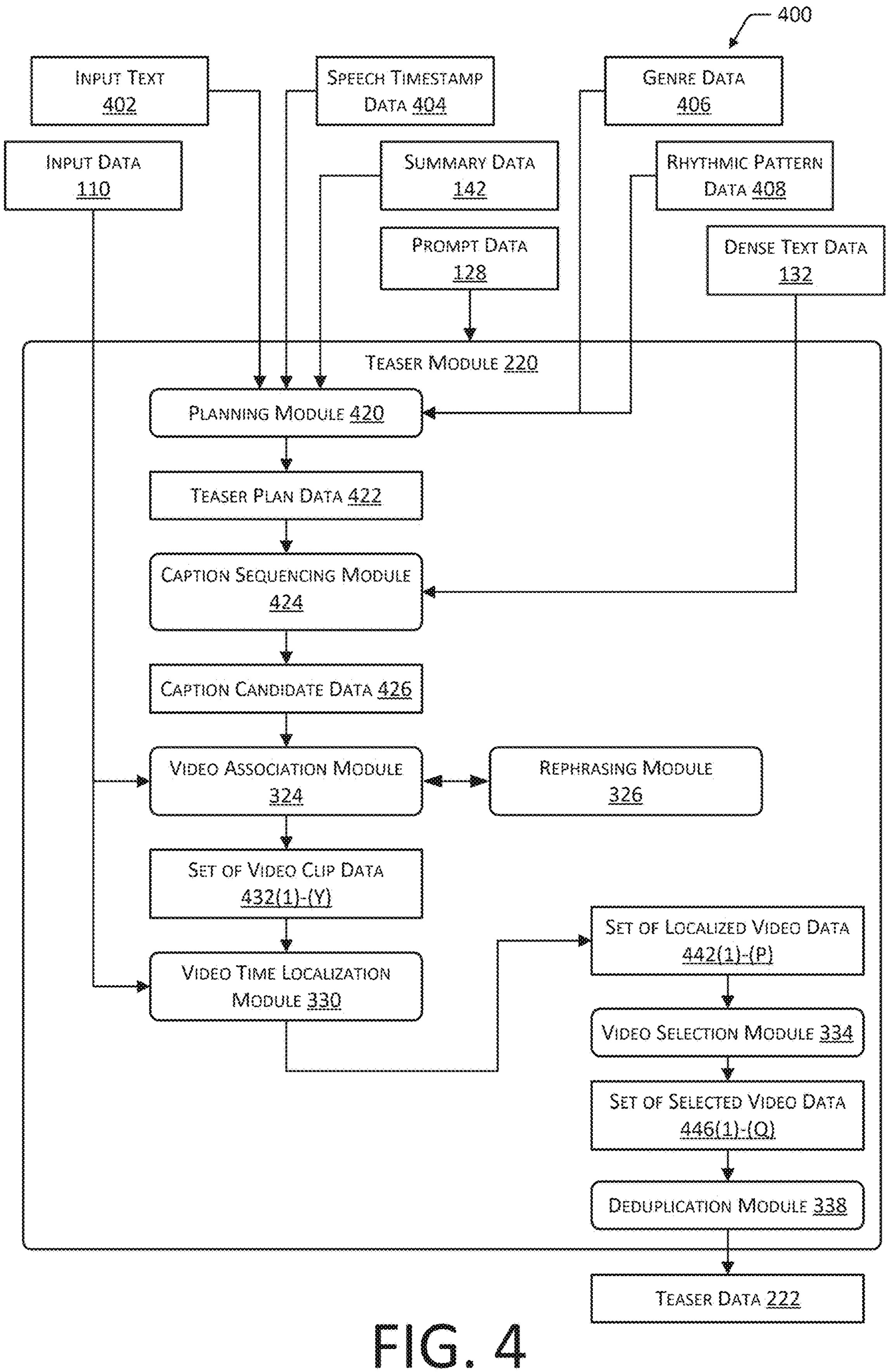
FIG. 4 illustrates a teaser module that accepts input data and generates a teaser portion of the recap data, according to some implementations.

FIG. 4 illustrates at 400 the teaser module 220 that accepts input data 110 and generates the teaser data 222 of the recap data 182, according to some implementations.

The teaser module 220 may comprise a planning module 420, a caption sequencing module 424, the video association module 324, the rephrasing module 326, the video time localization module 330, the video selection module 334, and the deduplication module 338.

The planning module 420 accepts as input the summary data 142, speech timestamp data 404, input text 402, and one or more prompts such as provided by prompt data 128. The summary data 142 may comprise episode summary data 146 for one or more episodes 116 to the specified point of the input data 110. The speech timestamp data 404 may comprise information as to when particular words are spoken in the teaser portion of the narration script 162. The speech timestamp data 404 may be determined by processing the narration audio data 252 to determine when particular words are spoken, when the intro text or outro text is being spoken, and so forth. The input text 402 comprises information such as an indication that a teaser portion is being generated, a portion of the narration script 162 that is associated with the teaser, and so forth.

The planning module 420 may also accept as inputs one or more of the DTD 132, genre data 406, or rhythmic pattern data 408. The genre data 406 is indicative of the genre of the input data 110. The genre data 406 may be determined based on the input data 110, the summary data 142, or may be retrieved from another data store. The rhythmic pattern data 408 is indicative of a timing pattern used to set the timing of presentation of elements in the teaser data 222. In some implementations the rhythmic pattern data 408 may be determined based on the genre data 406. For example, the genre of "action" may be associated with a previously specified rhythmic pattern with specified durations, such as {rhythm_seconds_duration={2, 2, 1, 1, 0.6, 0.6, 3}. In other implementations the rhythmic pattern data 408 may be determined based on processing other data, such as pacing of the speech in the narration audio data 252 or from selected music. For example, music selected as background music for the teaser or the entire recap may be analyzed to determine a beat or rhythmic pattern.

During operation, the planning module 420 is prompted to generate teaser plan data 422 based on the inputs. The teaser plan data 422 comprises an overall plan for the teaser data 222 that specifies generalized descriptions and associated time intervals. The time intervals may correspond to those specified in the rhythmic pattern data 408. For example, the teaser plan data 422 may include: "{time=00.00-02.00} Main character close-up. {time=02.01-4.00} Main character close-up. {time=04.01-05.00} Action. {time=05.01-06.00} Action. {time=06.01-06.60} Action. {time=06.61-07.21} Action. {time=07.22-10.22} Hopeful moment."

The caption sequencing module 424 accepts as input the teaser plan data 422, the DTD 132, and one or more prompts such as provided by prompt data 128. During operation, the caption sequencing module 424 is prompted to generate caption candidate data 426 based on the inputs. The caption candidate data 426 comprises detailed descriptions as to what should be depicted during the time intervals specified in the teaser plan data 422. For example, "{time=00.00-02.00} Close up shot of Alice as she arrives at the crime scene. {time=02.01-4.00} Close up shot of Alice as she inspects evidence."

The video association module 324 accepts as input the caption candidate data 426, the input data 110, and one or more prompts such as provided by the prompt data 128. During operation, the video association module 324 is prompted to generate a set of video clip data 432(1)-(Y), with video clips that are representative of the descriptions in the caption candidate data 426. For example, the video association module 324 may attempt to find portions of the input data 110 that have DTD 132 that corresponds to the description in the caption candidate data 426. The rephrasing module 326 may be used to rephrase the descriptions in the caption candidate data 426 and generate alternative candidate descriptions. These alternative candidate descriptions may then be provided to the video association module 324 and used to determine the set of video clip data 432(1)-(Y). As a result, each description in the caption candidate data 426 may be associated with a plurality of instances of video clip data. Some of these instances may be duplicative, and such deduplication may be addressed elsewhere in the process, such as by the deduplication module 338. Operation of the video association module 324 is discussed in more detail with regard to FIG. 6.

The set of video clip data 432(1)-(Y) comprises instances of video that may be relatively long in duration. The timing data in the DTD 132 that is used to find instances of video clip data may be relatively coarse, such as resolving to about 5 seconds. The instances of video may include portions that are not directly relevant to the description in the caption candidate data 426. For example, video clip data may include a shot depicting the crime scene, having a duration of 25 seconds. As a result, the instances of video clip data in the set of video clip data 432(1)-(Y) may be longer than necessary to satisfy the description in the caption candidate data 426 and the corresponding time interval.

The video time localization module 330 accepts as input the set of video clip data 432(1)-(Y) and one or more prompts such as provided by the prompt data 128. During operation, the video time localization module 330 is prompted to generate a set of localized video data 442(1)-(P). Each instance of localized video data is representative of a corresponding description in the caption candidate data 426, and may exhibit a duration that is less than its corresponding instance of video clip data that was provided as input. The video time localization module 330 may be considered to perform a time cropping function, resulting in time localized video that is highly relevant to the associated description. Operation of the video time localization module 330 is discussed in more detail with regard to FIG. 7.

The video selection module 334 accepts as input the set of localized video data 442(1)-(P) and one or more prompts such as provided by the prompt data 128. During operation, the video selection module 334 is prompted to select, from the inputs, a set of selected video data 446(1)-(Q). Each instance of selected video data is representative of a corresponding description in the caption candidate data 426. In some situations, duplicative instances of selected video data may be present in the set of selected video data 446(1)-(Q). These may be exact duplicates, or may comprise instances that overlap in time or otherwise present the same or substantially the same video. Operation of the video selection module 334 is discussed in more detail with regard to FIG. 8.

The deduplication module 338 accepts as input the set of selected video data 446(1)-(Q) and one or more prompts such as provided by the prompt data 128. During operation, the deduplication module 338 is prompted to generate teaser data 222 that does not include duplicative instances of video. The deduplication module 338 may remove exact duplicates, or may remove instances that overlap in time or otherwise present the same or substantially the same video. For example, a first instance of video may be associated with time 21.15 to 22.9 and a second instance may be associated with time 21.5 to 22.3. This may be deemed to be substantially the same, and one of these instances may be removed. The remaining non-duplicative instances of the set of selected video data 336(1)-(Q) are then used to generate the teaser data 222.

Figure 5:
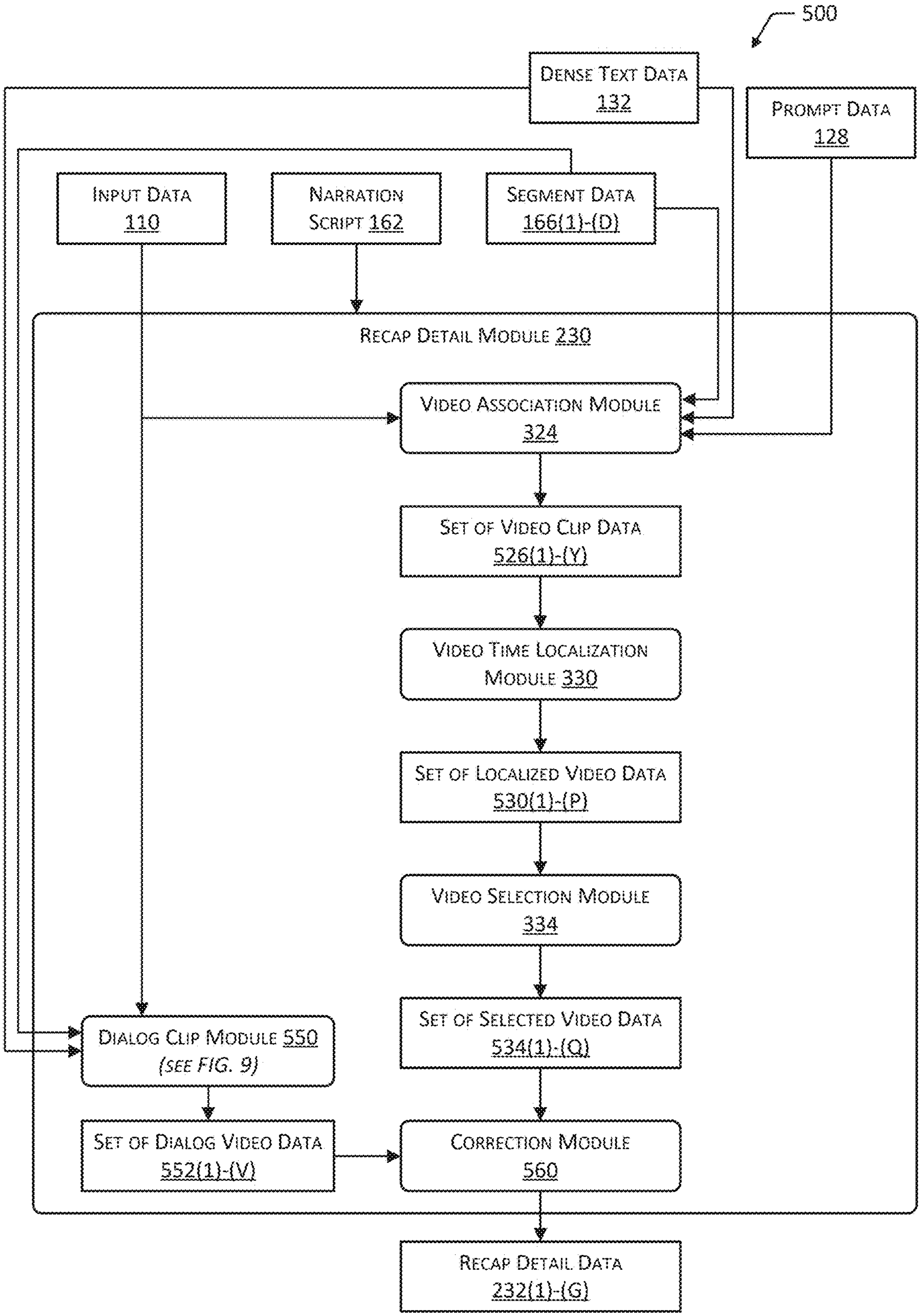
FIG. 5 illustrates a recap detail module that determines recap detail data, according to some implementations.

FIG. 5 illustrates at 500 the recap detail module 230 that determines recap detail data 232, according to some implementations.

The recap detail module 230 may comprise the video association module 324, the video time localization module 330, the video selection module 334, a correction module 560, and a dialog clip module 550.

The video association module 324 accepts as input the segment data 166, the input data 110, the DTD 132, and one or more prompts such as provided by the prompt data 128. During operation, the video association module 324 is prompted to generate a set of video clip data 526(1)-(Y), with video clips that are representative of the descriptions in the segment data 166. For example, the video association module 324 may attempt to find portions of the input data 110 that have DTD 132 that corresponds to the description in the segment data 166. Operation of the video association module 324 is discussed in more detail with regard to FIG. 6.

The set of video clip data 526(1)-(Y) comprises instances of video that may be relatively long in duration. The timing data in the DTD 132 that is used to find instances of video clip data may be relatively coarse, such as resolving to about 5 seconds. The instances of video may include portions that are not directly relevant to the description in the segment data 166. For example, video clip data may include a shot that pans from the ocean then towards the city of Los Angeles, having a duration of 15 seconds. As a result, the instances of video clip data in the set of video clip data 526(1)-(Y) may be longer than necessary to satisfy the description in the segment data 166.

The video time localization module 330 accepts as input the set of video clip data 526(1)-(Y) and one or more prompts such as provided by the prompt data 128. During operation, the video time localization module 330 is prompted to generate a set of localized video data 530(1)-(P). Each instance of localized video data is representative of a corresponding description in the segment data 166, and may exhibit a duration that is less than its corresponding instance of video clip data that was provided as input. The video time localization module 330 may be considered to perform a time cropping function, resulting in time localized video that is highly relevant to the associated description. Operation of the video time localization module 330 is discussed in more detail with regard to FIG. 7.

The video selection module 334 accepts as input the set of localized video data 530(1)-(P) and one or more prompts such as provided by the prompt data 128. During operation, the video selection module 334 is prompted to select, from the inputs, a set of selected video data 534(1)-(Q). Each instance of selected video data is representative of a corresponding description in the segment data 166. In some situations, duplicative instances of selected video data may be present in the set of selected video data 534(1)-(Q). These may be exact duplicates, or may comprise instances that overlap in time or otherwise present the same or substantially the same video. Operation of the video selection module 334 is discussed in more detail with regard to FIG. 8.

The dialog clip module 550 accepts as input the input data 110, the DTD 132, the segment data 166, and one or more prompts such as provided by the prompt data 128. During operation, the dialog clip module 550 is prompted to select, from the inputs, a set of dialog video data 552(1)-(V). Each instance of dialog video data comprises an instance of dialog that is associated with a corresponding portion of the segment data 166. In some implementations each instance of dialog video data may comprise video of a character speaking. Operation of the dialog clip module 550 is discussed in more detail with regard to FIG. 9.

The correction module 560 accepts as input the set of selected video data 534(1)-(Q), the set of dialog video data 552(1)-(V), and one or more prompts such as provided by the prompt data 128. During operation, the correction module 560 is prompted to generate recap detail data 232(1)-(G). The correction module 560 may provide recap detail data 232 that removes duplicates or instances of video that overlap in time or otherwise present the same or substantially the same video. The correction module 560 may also remove or re-order video that is presented in a chronologically incorrect order. For example, the correction module 560 may re-order video such that the video revealing the identity of the criminal comes after the video depicting the crime.

In some implementations, each instance of segment data 166(1)-(D) is associated with a portion of the recap detail data 232. For example, one or more instances of segment data 166 may be associated with a particular instance of selected video data or dialog video data. The recap detail data 232 may comprise a plurality of instances of video from one or more of the set of selected video data 534 or the set of dialog video data 552.

Figure 6:
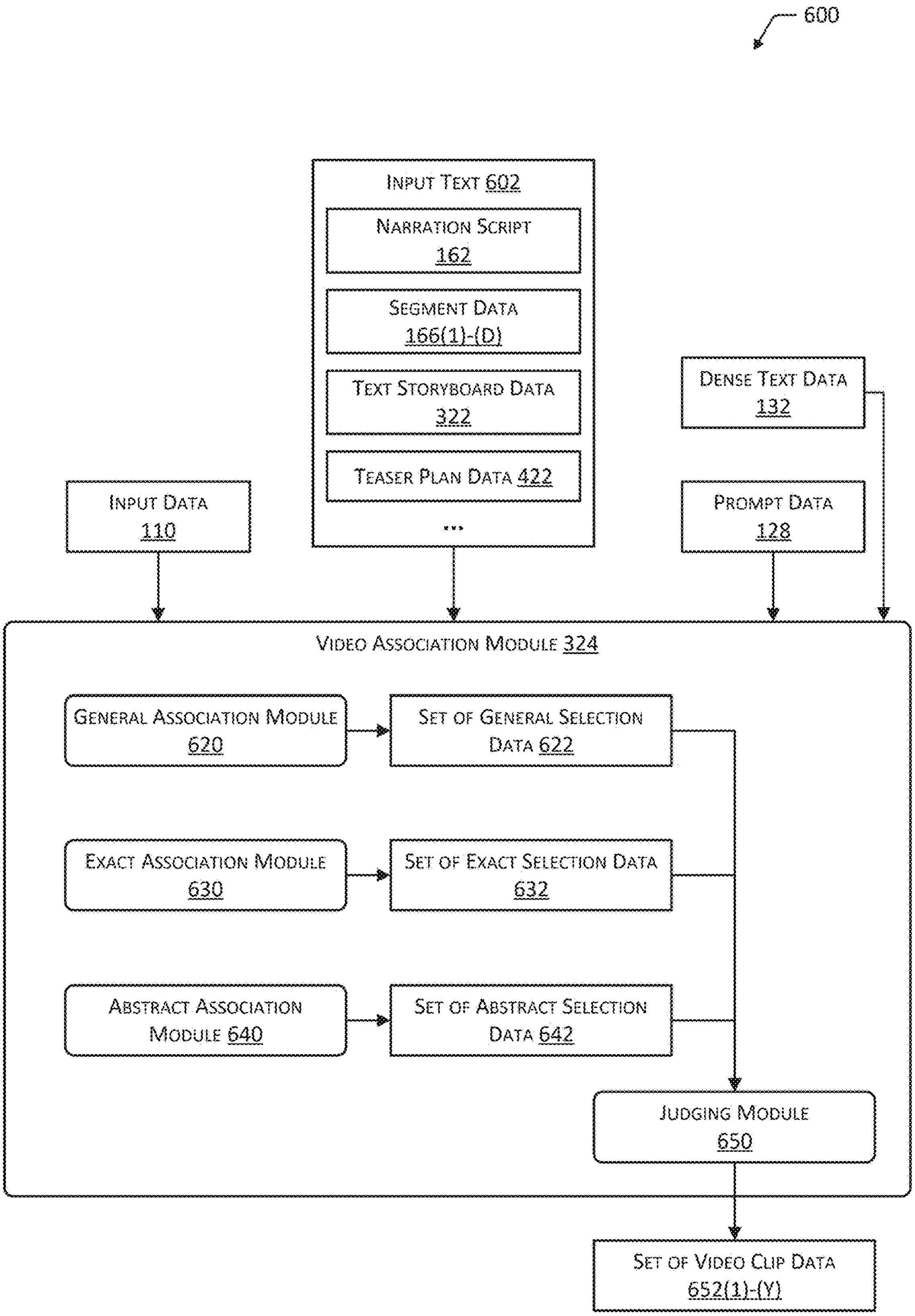
FIG. 6 illustrates a video association module that determines a set of video clips, according to some implementations.

FIG. 6 illustrates at 600 the video association module 324 that determines a set of video clips, according to some implementations.

The video association module 324 may comprise a general association module 620, an exact association module 630, an abstract association module 640, and a judging module 650.

The video association module 324 accepts as input the input data 110, the DTD 132, input text 602, and one or more prompts such as provided by the prompt data 128. The input text 602 may comprise one or more of the narration script 162, the segment data 166, the text storyboard data 322, the teaser plan data 422, or other data. The video association module 324 may comprise one or more ML models. During operation, the video association module 324 is prompted to generate a set of video clip data 652(1)-(Y), with video clips that are representative of the descriptions in the input text 602. The following examples are discussed with respect to the segment data 166, such as when used by the recap detail module 230. In other uses, other text may be used as input to the video association module 324. The video association module 324 may operate on an individual portion of text, such as an instance of segment data 166 and use the three modules to determine various video clips. These various video clips are then judged to determine which will be included in the set of video clip data 652.

The general association module 620 accepts the input and provides as output a set of general selection data 622. The general association module 620 uses one or more ML models that are prompted to perform a three-step algorithm. The first step involves providing the narration script 162 and the episode summary data 146 for the episodes to the specified point in the input data 110. The one or more ML models are prompted to associate each sentence of the narration script 162 with a specified maximum number of episodes. This provides a subset of the episodes 116 that will be used in the subsequent steps.

During the second step the one or more ML models are prompted to associate each sub-sentence or instance of segment data 166 with one or more scenes 118 in the subset of the episodes 116. During a third step the one or more ML models are prompted to use the sentence segment, associated scene summary data 144, and associated DTD 132 to determine video that has a description that is most relevant to the sentence segment. In some implementations the start time and the end time of the video may be specified by the timestamp data in the DTD 132. In some implementations, the start time and the end time of the video may be extended or padded by a specified duration, such as a few seconds. The instances of video that are determined to be most relevant are included in the set of general selection data 622.

The exact association module 630 accepts the input and provides as output a set of exact selection data 632. The exact association module 630 uses one or more ML models that are prompted to perform an algorithm that involves the following steps. The exact association module 630 is particularly useful in finding video that references a specific or exact event in a particular episode 116. The exact association module 630 will attempt to find a single instance of video that matches a particular instance of segment data 166. If more than one instance of video is found that matches the particular instance of segment data 166, then no video is selected by this module. The steps involved begin with assessing one or more of the narration script 162, the sentence of the narration script 162, or the segment data 166 to determine a single episode 116. The model is provided with the summary data 142 as input. If a single episode 116 is found, the process proceeds. If multiple episodes 116 are found that match, no video is selected and the process ends. If a single episode 116 is found that matches, the scenes 118 within the episode are assessed. If multiple scenes 118 are found that match, no video is selected and the process ends. If a single scene 118 is found that matches, portions of the scene 118 are assessed. These portions may comprise shots, portions of video that are associated with specified time stamps and textual description, specified time windows, and so forth. If a single portion is found that matches, that portion is the set of exact selection data 632.

The abstract association module 640 accepts the input and provides as output a set of abstract selection data 642. The abstract association module 640 uses one or more ML models that are prompted to perform an algorithm that involves the following steps. This module attempts to determine video clips that are associated with an instance of the segment data 166 that is abstract, such that there is no specific video that is related, but there may be video that conveys one or more of the mood or tone of the instance of the segment data 166. In a first step, the DTD 132 or other data that provides descriptions of the video for the series 112 up to the specified point is stacked in a block of N video descriptions each. For each block, the model is prompted to find M video descriptions that relate to the instance of segment data 166 in an abstract manner. In a second step, the model is then asked to choose only P final video descriptions, resulting in the set of abstract selection data 642.

In one implementation the set of video clip data 652(1)-(Y) may comprise the set of general selection data 622, the set of exact selection data 632, and the set of abstract selection data 642. In another implementation the judging module 650 accepts as input one or more of the set of general selection data 622, the set of exact selection data 632, or the set of abstract selection data 642 and determines the set of video clip data 652(1)-(Y) as output. The judging module 650 may use a model that is prompted to find, for a given instance of segment data 166, the video that is most representative of that segment. In some implementations, other prompts may be used. For example, the judging module 650 may be prompted to find the shortest video that is associated with the instance of segment data 166.

In one implementation, the duration of individual instances of video clip data in the set of video clip data 652 may be a fixed duration, such as 30 seconds. In other implementations the duration of individual instances of video clip data may be variable.

Figure 7:
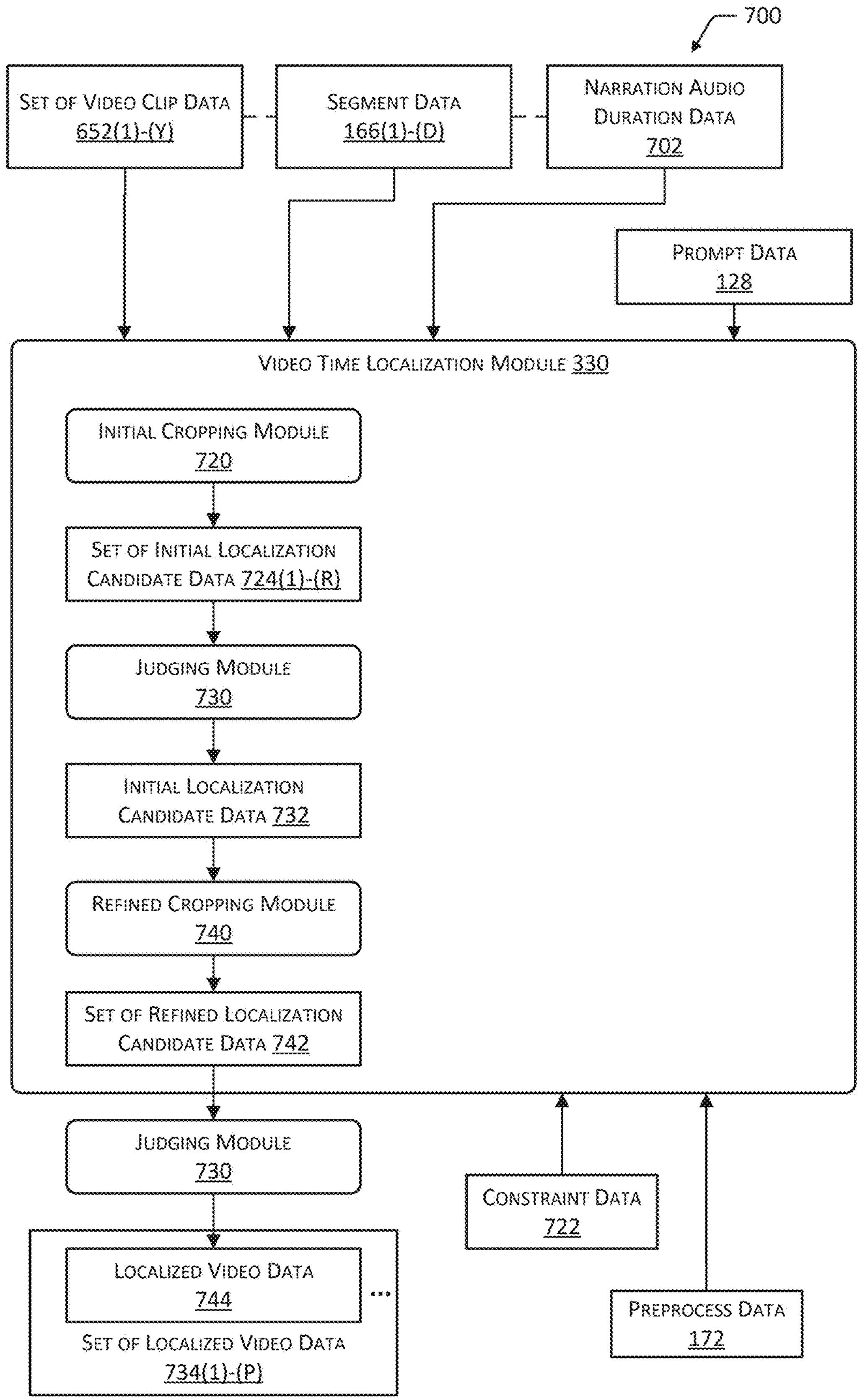
FIG. 7 illustrates a video time localization module that determines a set of time localized video clips, according to some implementations.

FIG. 7 illustrates at 700 the video time localization module 330 that determines a set of time localized video clips, according to some implementations.

The video time localization module 330 may comprise an initial cropping module 720, a judging module 730, and a refined cropping module 740. The video time localization module 330 accepts as input an instance of the segment data 166, narration audio duration data 702, the set of video clip data 652(1)-(Y) that are associated with the instance of the segment data 166, and one or more prompts such as provided by the prompt data 128.

The narration audio duration data 702 comprises information indicative of the duration of the narration audio that corresponds to the instance of segment data 166. For example, the narration audio duration data 702 may have a value of 2.4 seconds, indicating how long the narrated audio for that sentence segment takes to present. The desired outcome of the video time localization module 330 is to provide instances of initial localized video data 744 that are relevant with respect to the narration script 162 and have durations that are consistent with the narrated audio, such that they may be readily included in the recap data 182.

The video time localization module 330 may comprise one or more ML models that are prompted to perform the following multi-step algorithm.

During a first step, the initial cropping module 720 divides an instance of video clip data into N videos that comprise a set of initial localization candidate data 724(1)-(R). Each instance of the initial localization candidate data 732 has a duration that is equal to the duration of the narration as specified by the narration audio duration data 702. This division may be performed in a windowing fashion, such that a window having a duration equal to the duration of the narration is incrementally indexed through the entirety of the instance of the video clip data.

The judging module 730 assesses pairs of the initial localization candidates to determine which initial localization candidate of each pair is deemed best. For example, an MLLM may be prompted to perform the judging. In some implementations the pairs may be selected randomly from the set of initial localization candidate data 724. At the conclusion of the first step, a single instance of initial localization candidate data 732 has been determined that is associated with a given portion of the narration audio data 252.

During a second step, the refined cropping module 740 divides the initial localization candidate data 732 into M videos that comprise a set of refined localization candidate data 742. Each instance of the refined localization candidate data may have a duration that is equal to the duration of the narration as specified by the narration audio duration data 702. This division may be performed in a windowing fashion, such that a window having a duration equal to the duration of the narration is incrementally indexed through the entirety of the initial localization candidate data 732. In one implementation, each window may have a start time that is incremented from a previous window start time by a fixed value, such as 0.1 to 0.2 seconds. The start times of the refined localization candidates may be expressed using the following equation:

$$T_0 - 0.2 * \frac{M}{2},\ T_0 + 0.2 * \frac{M}{2}$$

where $T_0$ is the start time of the first initial localization candidate, and

M specifies the number of videos to divide the initial localization candidate data 732 into. EQUATION 1

The judging module 730 may be used again, this time to assess pairs of the set of refined localization candidate data 742 to determine which refined localization candidate of each pair is deemed best. For example, an MLLM may be prompted to perform the judging. In some implementations the pairs may be selected randomly from the set of refined localization candidate data 742. At the conclusion of the second step, a single instance of localized video data 744 has been determined that is associated with a given portion of the narration audio data 252. This instance of localized video data 744 is one instance of the set of localized video data 734.

The video time localization module 330 serves to extract, from a relatively long clip of video provided at the input that may be 30 seconds or more in length, a clip of video that is relevant to a portion of the narration and has a duration that fits within the time associated with that narration.

During operation, one or more of the modules of the video time localization module 330 may be operated subject to one or more constraints specified by constraint data 722. These constraints may be used to provide output that is likely to be deemed more aesthetically pleasing.

In one implementation a constraint may specify that the shot boundaries, such as specified in the preprocess data 172, are used to constrain the formation of the windows or the judging of videos to avoid including momentary portions of a preceding or following shot. For example, a localization candidate may be rejected if it begins with, or ends with, less than a specified time duration of a different shot. This constraint avoids the selection of a clip that may include a momentary glimpse of another shot, which may be disconcerting to a viewer.

In another implementation a constraint may specify that a clip is not to depict a person who is speaking. This may be done to avoid the effect of "lip flap" in which a video portrays one person speaking while the audio is either grossly out of synchronization or is unrelated. For example, this constraint prevents having a clip that features characters talking while narration audio is being presented. The determination of instances of dialog video that involve dialog that is inserted into the recap data 182 is discussed with regard to FIG. 9.

Figure 8:
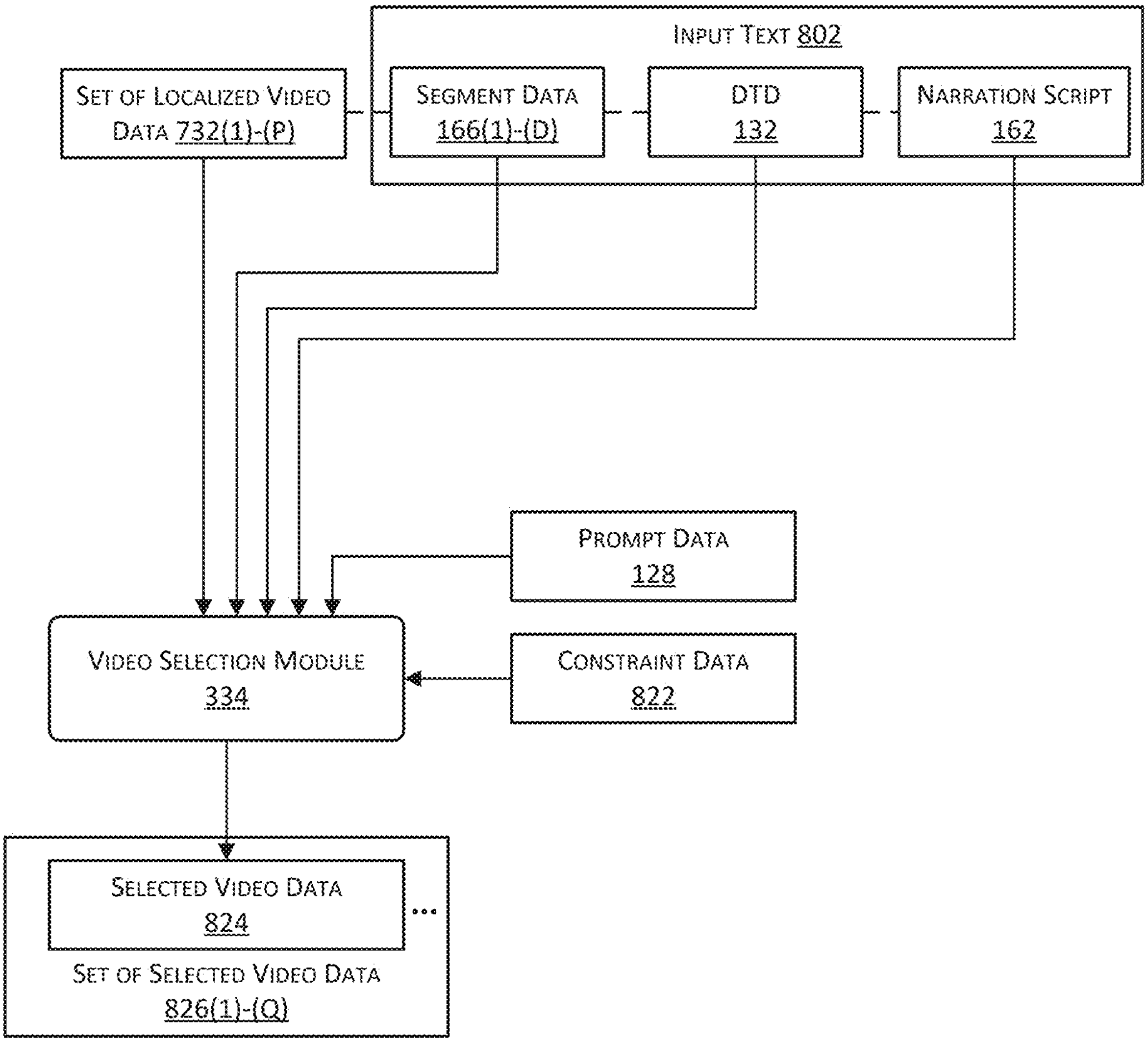
FIG. 8 illustrates a video selection module that determines selected video data from the set of time localized video clips, according to some implementations.

FIG. 8 illustrates at 800 the video selection module 334 that determines selected video data 824 from the set of time localized video clips, according to some implementations.

The video selection module 334 accepts as input the set of localized video data 734(1)-(P), input text 802, and one or more prompts such as provided by the prompt data 128. The input text 802 may comprise one or more of the narration script 162, the segment data 166, the DTD 132, or other data that is associated with an individual instance of the set of localized video data 734. The video selection module 334 may comprise one or more ML models. During operation, the video selection module 334 is prompted to judge the instances of localized video data in the set of localized video data 734 and select one as an instance of selected video data 824 that is determined by the model to be a best fit to the associated instance of the segment data 166. The selected video data 824 is an instance of a set of selected video data 826(1)-(Q) that may be generated during operation of the system 100.

Figure 9:
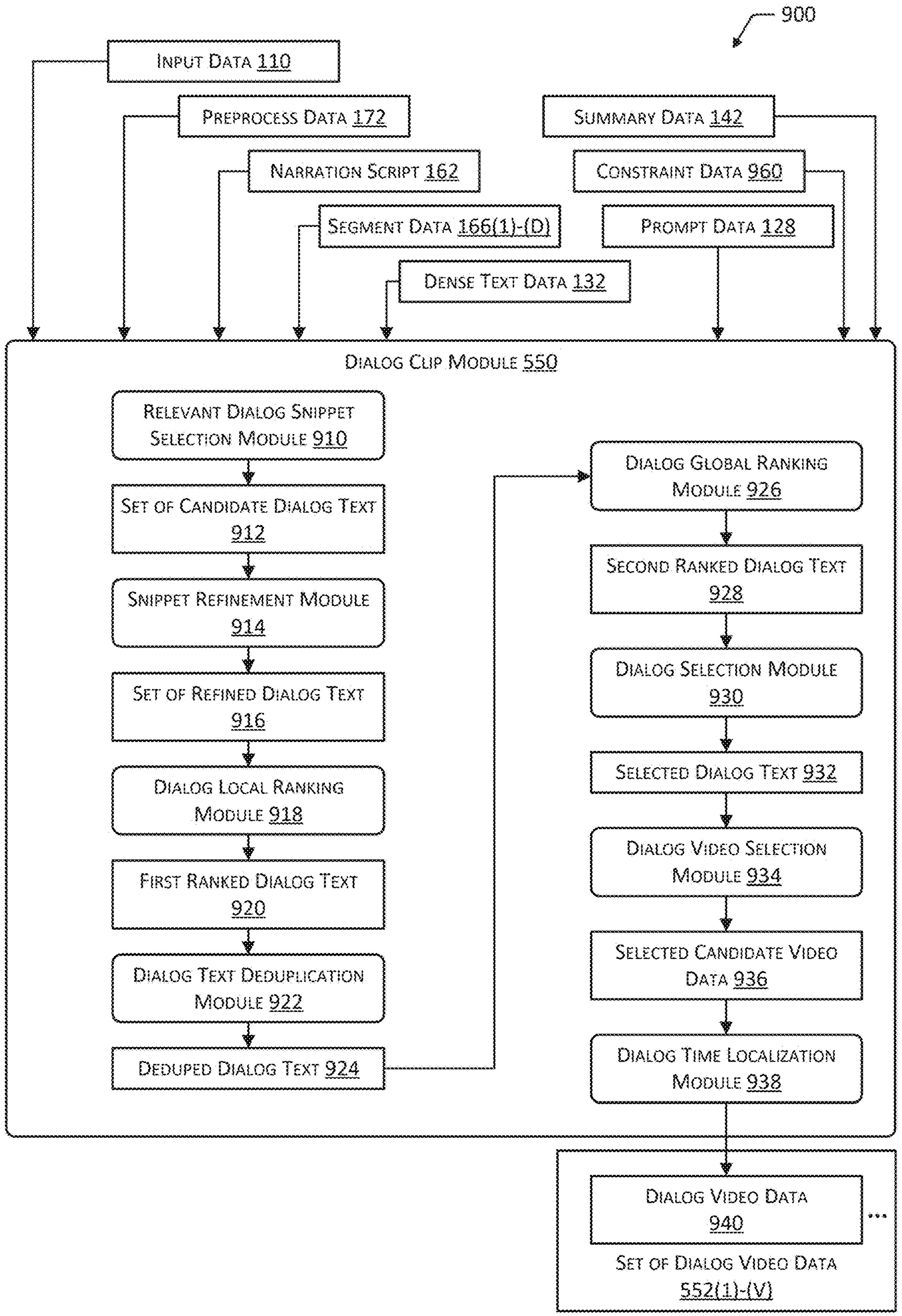
FIG. 9 illustrates a dialog clip module that determines a set of dialog video clips, according to some implementations.

FIG. 9 illustrates at 900 the dialog clip module 550 that determines a set of dialog video clips, according to some implementations.

The dialog clip module 550 may comprise a relevant dialog snippet selection module 910, a snippet refinement module 914, a dialog local ranking module 918, a dialog text deduplication module 922, a dialog global ranking module 926, a dialog selection module 930, a dialog video selection module 934, and a dialog time localization module 938.

As described above, the narration script 162 may be deemed to be fixed before operation of other modules, such as the dialog clip module 550. The instances of dialog video data 940 in a set of dialog video data 552(1)-(V) may thus comprise video that may be inserted during the assembly process that does not change the narrated audio. In one implementation, the instances of dialog video data 940 may be inserted at the end of an associated instance of segment data 166 or sentence in the narration script 162.

The inputs to the dialog clip module 550 may include one or more of the input data 110, the preprocess data 172, the narration script 162, the segment data 166, the DTD 132, the summary data 142, constraint data 960, one or more prompts such as provided in the prompt data 128, or other data. The dialog clip module 550 may comprise one or more ML models.

The relevant dialog snippet selection module 910 accepts as input the DTD 132 and the summary data 142 to the specified point and one or more of the narration script 162 or the segment data 166. The relevant dialog snippet selection module 910 is prompted to determine a set of candidate dialog text 912 based on the input. In one implementation, the relevant dialog snippet selection module 910 may associate each sentence segment of segment data 166 in the narration script 162 with a respective episode 116 in a season 114 that is deemed most likely to contain relevant dialog to that sentence or segment of segment data 166. The DTD 132 of the relevant episodes 116 may then be assessed for relevant dialog snippets or portions that relate to the sentence or segment of segment data 166 in the narration script 162. The model used to perform this task may be conditioned on a target sentence and using the DTD 132 for the relevant episode. In some implementations, scene summary data 144 may also be provided as context to the one or more models. The model may also be prompted to filter out irrelevant instances of dialog text and validate and correct the text in the snippets, such that the set of candidate dialog text 912 contains dialog text that is accurate to the inputs. The set of candidate dialog text 912 comprises portions of the input data 110 that are associated with the portion of the narration script 162 or instance of the segment data 166.

The snippet refinement module 914 accepts as input the set of candidate dialog text 912 and determines a set of refined dialog text 916. For example, the snippet refinement module 914 may be prompted to determine the instances of candidate dialog text that are deemed to be suitable. Suitability may be assessed to determine dialog text that does not miss adjacent dialog lines that are necessary to express a complete thought, to avoid redundant dialogue lines that may deviate from the point of the snippet, have a length that is too long or too short for inclusion in the recap data 182, and so forth. The snippet refinement module 914 may mitigate issues that may result from insufficient focus by an ML model during operation. Such insufficient focus may result from the ML model operating on a relatively large corpus of text, resulting in an inability to deeply focus on every snippet of dialog text that is retrieved. Such insufficient focus may result in incomplete, unfocused, very long, or very short snippets of dialog text.

The snippet refinement module 914 may be operated to perform an N-caption "search interval" around the instance of candidate dialog text that is provided in the input. The search interval may be specified such that it does not cross a scene boundary. The snippet refinement module 914 may assign portions of the data in search interval component designations, such as dialog, sound description, or visual description.

An instance of candidate dialog text that is associated with the search interval may be divided, using a model, into one or more components. These components may include a dialogue line, a sound description, or a visual description. The instance of candidate dialog text that is in the set of refined dialog text 916 may comprise the components that are designated as dialog lines, removing others such as sound descriptions or video descriptions.

The snippet refinement module 914 may use a sliding time window approach, using a plurality of different window widths. The sliding time window approach allows the set of refined dialog text 916 to include different portions of the input data 110.

The snippet refinement module 914 may be prompted determine instances of refined dialog text 916 that conform to one or more timing constraints. For example, the constraint data 960 may specify a minimum outer duration, maximum outer duration, minimum inner duration, maximum inner duration, and so forth. The outer duration may comprise a total time between the start and end of a snippet, including any gaps, pauses, or non-speech intervals within the portion. The inner duration may comprise a sum of the durations of actual spoken words within a portion, excluding any silence or non-verbal intervals within the portion. In some implementations the timing constraints may be based on timing associated with the narration audio data 252.

The dialog local ranking module 918 accepts as input the set of refined dialog text 916 and provides as output first ranked dialog text 920. The dialog local ranking module 918 may accept as input associated information such as a context description, summary data 142 such as scene summary data 144, the portion of the narration script 162 or segment data 166, and so forth. The dialog local ranking module 918 may rank the inputs per-sentence or per segment, and provide the top ranked p outputs, where p is a selected natural number. The dialog local ranking module 918 may condition the ML model based on the target sentence of the narration script 162 or the segment of the segment data 166, and the narration script 162. For each instance of refined dialog text in the set of refined dialog text 916, the ML model may be provided with a generated description of the context in which the dialog text occurs, including relevant character interactions, setting, important events leading up to or following the dialog, and so forth. The ML model may also be provided with the associated scene summary data 144. The dialog local ranking module 918 may be prompted to rank the snippets in descending order based on their fit, where fit is defined as a combination of relevance and memorability, such as described below.

The dialog text deduplication module 922 accepts as input the first ranked dialog text 920 and provides as output deduped dialog text 924. For example, the dialog text deduplication module 922 may remove from the output instances of dialog text that are exact matches, share more than a specified number of words in the same order, and so forth.

In one implementation, a clustering technique may be used in which instances of first ranked dialog text 920 are clustered based on association with intersecting dialog captions. For example, if they include the same dialog text, they would be deemed to overlap. Clusters that contain more than a single instance of candidate dialog video data may be deemed duplicative and may be resolved.

In one implementation, for each cluster that contains two or more instances of first ranked dialog text 920, a pair of conflicting portions of the narration script 162 or segment data 166 that are associated with the cluster are selected. For example, the set of narration script 162 sentences that conflict are processed by a model that is prompted to judge which is better. The process may continue pairwise until all conflicts have been resolved.

The dialog global ranking module 926 accepts the deduped dialog text 924 as input and determines second ranked dialog text 928. The dialog global ranking module 926 may accept as input associated information such as a context description, summary data 142 such as scene summary data 144, the portion of the narration script 162 or segment data 166, and so forth. The dialog global ranking module 926 may be prompted to rank the entirety of the instances of dialog text in the deduped dialog text 924 and provide the top ranked q outputs, where q is a selected natural number. The model may accept as context a description of the context within which the dialog text occurs, as well as associated scene summary data 144. The model may be prompted to rank the pairs of target sentences in the narration script 162 and the associated dialog text in the deduped dialog text 924 based on a combination of relevance to the target sentence and memorability.

The modules performing ranking, such as the dialog local ranking module 918 or the dialog global ranking module 926, may be prompted to rank instances of their input based on considerations such as relevance or memorability. Relevance may be a determination as to how relevant the instance of dialog text is with respect to the portion of the narration script 162 or segment data 166. Memorability may be a determination as to how memorable the instance of dialog text is. For example, memorability may be determined based on inclusion in summary data 142, inclusion in other data such as social media data, quotation in reviews, frequency that the dialog was re-viewed by viewers, and so forth.

In one implementation, ranking may implement a listwise ranking approach to assess the instances of dialog text. To mitigate potential positional bias and consistency issues, the permutation self-consistency approach, as proposed by Raphael Tang, et al. in "Found in the Middle: Permutation Self-Consistency Improves Listwise Ranking in Large Language Models", may be used.

The dialog selection module 930 accepts as input the second ranked dialog text 928 and provides as output selected dialog text 932. For example, the dialog selection module 930 may determine the instances of dialog text in the second ranked dialog text 928 based on its placement with respect to the narration script 162, importance with regard to the narration script 162, and so forth.

In some implementations one or more techniques may be performed in parallel. For example, the search to find the set of candidate dialog text 912 may be performed in parallel, processing many portions of the narration script 162 contemporaneously.

The dialog selection module 930 during operation may take into consideration various constraints as specified by the constraint data 960. The constraint data 960 may specify a maximum number of instances of dialog text that may be selected for a given instance of recap data 182. For example, a maximum percentage of the number of sentences of the narration script 162 may be allowed to have associated instances of dialog text. In another example, a maximum number of instances of dialog text may be permitted.

The constraint data 960 may specify a particular distribution of dialog text with respect to the overall recap data 182. This may be done to minimize "bunching", such as the recap data 182 containing multiple instances of dialog text that are consecutive. In one implementation, the constraint may specify a number of instances of dialog text that are inserted per paragraph of the narration script 162. The dialog clip module 550 may take into account the position of the corresponding portion of the narration script 162 and provide for a uniform distribution of a dialog quota across the narration script 162. For example, for each paragraph with a specified quote, the top N instances of dialog text may be selected for use.

The dialog video selection module 934 accepts as input one or more instances of the selected dialog text 932 and is prompted to determine selected candidate video data 936. In some implementations the dialog video selection module 934 may use the same or similar techniques described with respect to the video association module 324, or the video time localization module 330, to determine the selected candidate video data 936.

In some implementations, a candidate context description may be generated that describes a context of an instance of the selected candidate video data 936. The candidate context description may include one or more of relevant character interactions, description of setting, description of important events leading up to or following the dialog, and so forth.

The instances of selected candidate video data 936 may be further processed by a dialog time localization module 938. The dialog time localization module 938 may comprise a model that is prompted to trim an instance of selected candidate video data 936 to determine an instance of dialog video data 940. The dialog time localization module 938 may operate subject to constraints specified in the constraint data 960. For example, the constraint data 960 may specify that the video includes the entirety of the dialog and does not truncate a beginning or ending of the dialog. In another example, the constraint data 960 may specify that the video does not contain speech or a sound that is unrelated to the portion of the associated narration script 162 or segment data 166. In another example, the constraint data 960 may specify that the video does not include a shot boundary, or does not otherwise span a shot boundary. In another example, the constraint data 960 may specify that the video should include a short pause before and after the dialog.

During operation, the dialog time localization module 938 may use various techniques to process the selected candidate video data 936 and determine more precise timestamps indicative of the dialog uttered therein. For example, the WhisperX system promulgated by Max Bain may be used to determine detailed timestamp data of the words spoken in the selected candidate video data 936. In some implementations, the detailed timestamp data may be padded or adjusted to account for process variation. For example, start and end times may be padded by 100 milliseconds each.

Other audio processing, such as the inclusion of transition effects may also be performed on the dialog video data 940. This is discussed with regard to FIG. 10.

The set of dialog video data 552 provided by the dialog clip module 550 may then be included in the recap detail data 232 as described with regard to FIG. 5. In some implementations, instances of dialog video data 940 may be inserted into other portions, such as the intro supplemental data 212(1), teaser data 222, or outro supplemental data 212(2).

Figure 10:
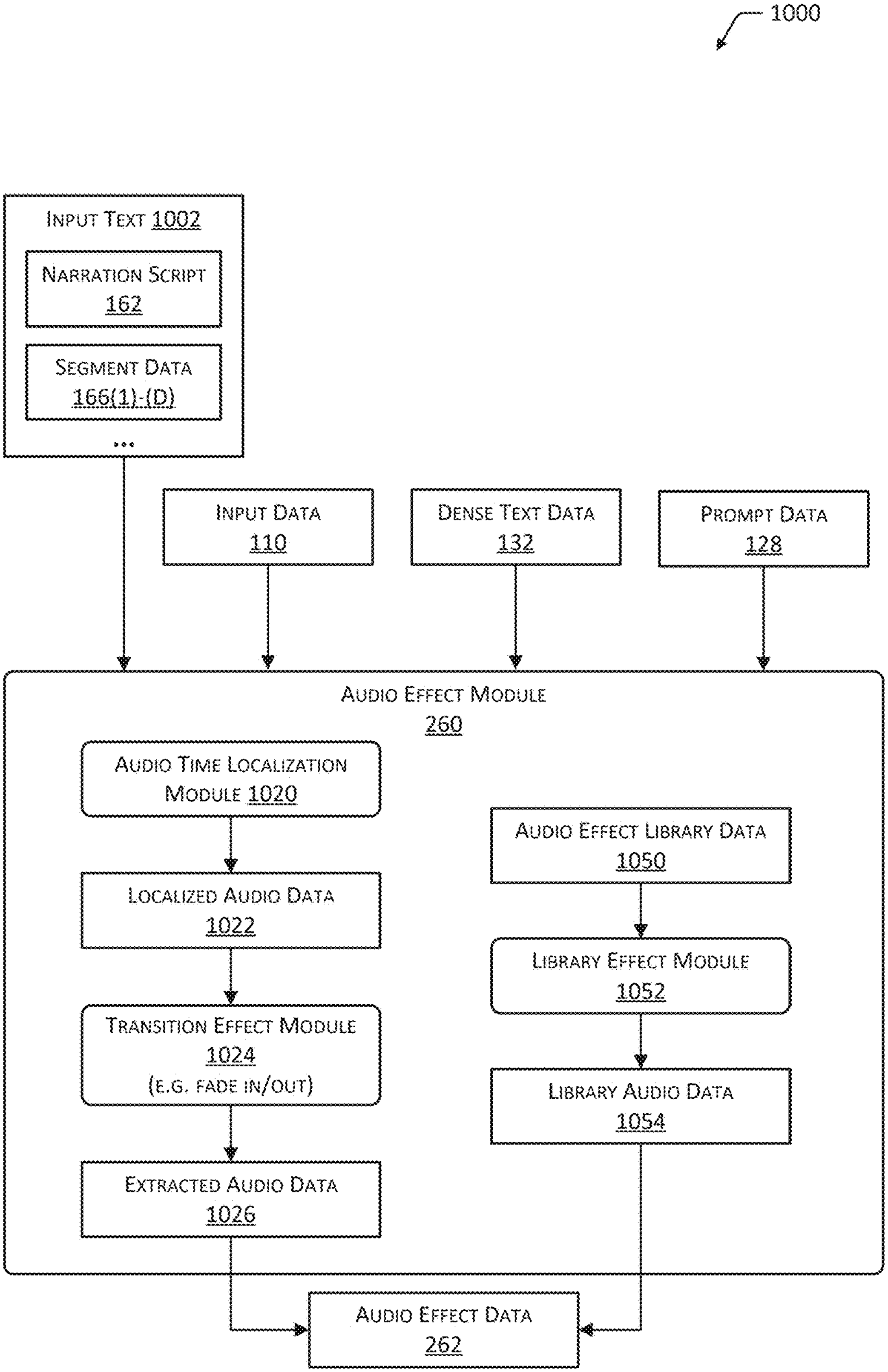
FIG. 10 illustrates an audio effect module that determines audio effects, according to some implementations.

FIG. 10 illustrates at 1000 the audio effect module 260 that determines audio effects, according to some implementations.

The audio effect module 260 may comprise an audio time localization module 1020, a transition effect module 1024, and a library effect module 1052. The audio effect module 260 accepts as input the input data 110 or data extracted therefrom, the DTD 132, input text 1002, and one or more prompts such as provided by the prompt data 128. For example, the input text 1002 may comprise one or more of the narration script 162 or the segment data 166.

The audio time localization module 1020 accepts as input the input text 1002 and the DTD 132 to determine localized audio data 1022. For example, if the narration script 162 describes "the meteor crashes to Earth", the DTD 132 may be searched to find data such as "sound of meteor crashing" and the associated timestamps.

The audio time localization module 1020 may process the audio data to localize the audio to the particular sound that is desired. This audio localization may be performed based on one more techniques. For example, a signal processing approach may be used to determine the start and end time of a particular sound based on amplitude, frequency, spectral power distribution, and so forth. In another example, a model may be prompted to determine the start and end time.

The localized audio data 1022 may be processed by a transition effect module 1024 to add one or more audio transition effects to provide extracted audio data 1026. For example, a fade in that increases loudness over time or a fade out that decreases loudness over time may be applied to the beginning and end of the localized audio data 1022, respectively. The extracted audio data 1026, in addition to the audio information, may include timestamp or other time indicia data indicating its placement with respect to the recap data 182. For example, the particular instance of extracted audio data 1026 may be associated with a time index value of 17.2 seconds with respect to the start of the recap data 182.

The audio effect data 262 may comprise the extracted audio data 1026 provided by the transition effect module 1024.

The audio effect data 262 may also comprise library audio data 1054 provided by the library effect module 1052. In some implementations additional audio effects may be used in the recap data 182 that are not otherwise derived from the input data 110. For example, sound effects such as a "cinematic boom" or "whoosh" sounds may be used to provide a particular emotional impact, heighten tension, and so forth. Audio effect library data 1050 comprises one or more instances of these sound effects. The library effect module 1052 selects, from the audio effect library data 1050, one or more instances of library audio data 1054. For example, based on the narration script 162, a "cinematic boom" may be selected for inclusion at the end of a sentence that describes a dramatic element.

Figure 11:
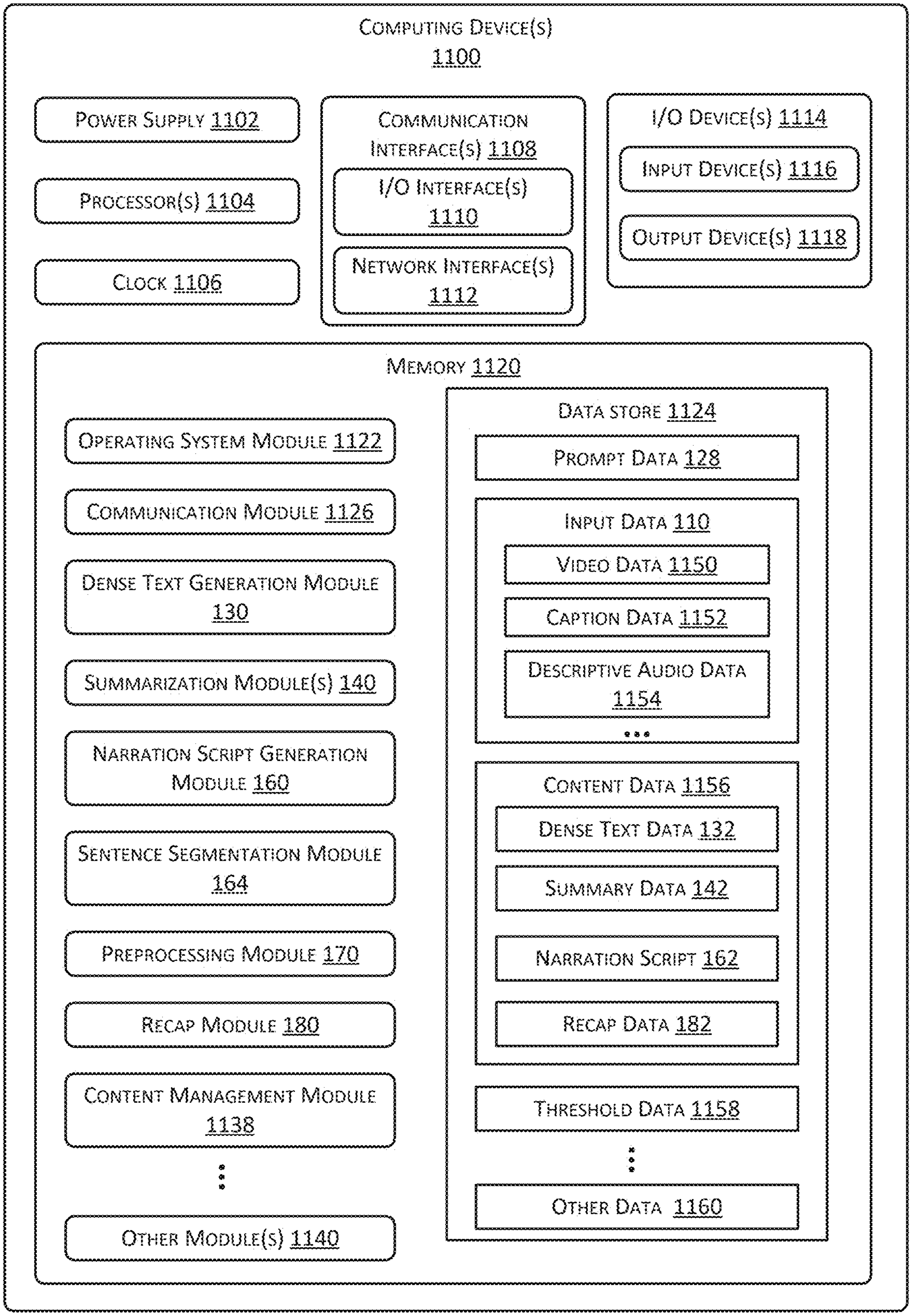
FIG. 11 is a block diagram of a computing device to execute at least a portion of the system, according to some implementations.

FIG. 11 is a block diagram of a computing device 1100 to execute at least a portion of the system 100, according to some implementations. The computing device 1100 may be physically present at a facility, may be accessible by a network, or a combination of both. The computing device 1100 does not require end-user knowledge of the physical location and configuration of the system that delivers the services. Common expressions associated with the computing device 1100 may include "embedded system", "on-demand computing", "software as a service (Saas)", "platform computing", "network-accessible platform", "cloud services", "data centers", and so forth. Services provided by the computing device 1100 may be distributed across one or more physical or virtual devices.

One or more power supplies 1102 may be configured to provide electrical power suitable for operating the components in the computing device 1100. The computing device 1100 may include one or more hardware processors 1104 (processors) configured to execute one or more stored instructions. The processors 1104 may comprise one or more cores, and may comprise central processing units (CPUs), graphics processing units (GPUs), application specific integrated circuits (ASICs), and so forth. One or more clocks 1106 may provide information indicative of date, time, ticks, and so forth.

The computing device 1100 may include one or more communication interfaces 1108 such as input/output (I/O) interfaces 1110, network interfaces 1112, and so forth. The communication interfaces 1108 enable the computing device 1100, or components thereof, to communicate with other devices or components. The communication interfaces 1108 may include one or more I/O interfaces 1110. The I/O interfaces 1110 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1110 may couple to one or more I/O devices 1114. The I/O devices 1114 may include input devices 1116 such as one or more of a keyboard, mouse, sensor, and so forth. The I/O devices 1114 may also include output devices 1118 such as one or more of a display device, printer, audio speakers, and so forth. In some embodiments, the I/O devices 1114 may be physically incorporated with the computing device 1100 or may be externally placed.

The network interfaces 1112 may be configured to provide communications between the computing device 1100 and other devices, such as routers, access points, and so forth. The network interfaces 1112 may include devices configured to couple to personal area networks (PANs), local area networks (LANs), wireless local area networks (WLANS), wide area networks (WANs), and so forth. For example, the network interfaces 1112 may include devices compatible with Ethernet, Wi-Fi, Bluetooth, ZigBee, and so forth.

The computing device 1100 may also include one or more buses or other internal communications hardware or software that allow for the transfer of data between the various modules and components of the computing device 1100.

As shown in FIG. 11, the computing device 1100 includes one or more memories 1120. The memory 1120 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1120 provides storage of computer-readable instructions, data structures, program modules, and other data for the operation of the computing device 1100. A few example functional modules are shown stored in the memory 1120, although the same functionality may alternatively be implemented in hardware, firmware, and so forth.

The memory 1120 may include at least one operating system (OS) module 1122. The OS module 1122 is configured to manage hardware resource devices such as the I/O interfaces 1110, the I/O devices 1114, the communication interfaces 1108, and provide various services to applications or modules executing on the processors 1104. The OS module 1122 may implement a variant of the FreeBSD operating system as promulgated by the FreeBSD Project; other UNIX or UNIX-like variants; a variation of the Linux operating system; the Windows operating system from Microsoft Corporation of Redmond, Washington, USA; and so forth.

Also stored in the memory 1120 may be a data store 1124 and one or more of the following modules. These modules may be executed as foreground applications, background tasks, daemons, and so forth. The data store 1124 may use a flat file, database, linked list, tree, executable code, script, or other data structure to store information. In some implementations, the data store 1124 or a portion of the data store 1124 may be distributed across one or more other devices including the computing devices 1100, network attached storage devices, and so forth.

A communication module 1126 may be configured to establish communications with other computing devices 1100, or other devices. The communications may be authenticated, encrypted, and so forth.

The memory 1120 may also store one or more of the dense text generation module 130, the one or more summarization modules 140, the narration script generation module 160, the sentence segmentation module 164, the preprocessing module 170, or the recap module 180, as described above.

The memory 1120 may store a content management module 1138. The content management module 1138 may perform functions such as storing and serving instances of content data 1156. For example, the content management module 1138 may receive requests for instances of content data 1156 from a device and provide a stream of the requested instances to the requesting devices.

Other modules 1140 may also be present in the memory 1120 as well as other data 1160 in the data store 1124. For example, an ML module may comprise one or more ML models that may be executed for use by the other modules of the system 100. In another example, a contextual advertising module may determine one or more advertisements for presentation based on the content data 1156. Continuing the example, content data 1156 that indicates a presentation of a snowy scene may result in presentation of an advertisement for cold weather clothing.

The data store 1124 may store one or more of prompt data 128, input data 110, content data 1156, the narration script 162, the recap data 182, or other data 1160. The prompt data 128 may comprise one or more of the prompts that are associated with the various operations described with regard to the modules herein. For example, the prompt data 128 may comprise prompts that are used to generate speaker annotations, determine invalid annotations, and so forth. The input data 110 may comprise video data 1150, caption data 1152, descriptive audio data 1154, and so forth. The content data 1156 may comprise the DTD 132, the summary data 142, the narration script 162, the recap data 182, or other information that is associated with the input data 110.

Threshold data 1158 may comprise one or more values that are associated with operation of the system 100. For example, the threshold data 1158 may specify a maximum number of words that the narration script 162 is permitted to have.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:

one or more memories, storing computer-executable instructions; and one or more hardware processors to execute the computer-executable instructions to:

determine input data comprising video data with associated audio data;

determine dense text data (DTD) that is associated with the input data, wherein the DTD comprises text data that is indicative of one or more of: dialog, speaker annotation indicative of who uttered dialog, people, action, event, or setting;

determine summary data that is associated with the input data, wherein the summary data summarizes a portion of the input data;

determine a narration script using a first set of prompts, the summary data, and at least a portion of the DTD as input to a first set of machine learning (ML) models;

determine segment data using a second set of prompts and the narration script as input to the first set of ML models; and determine recap data using a third set of prompts, the segment data, and the input data as input to the first set of ML models, wherein the recap data comprises audio and video.

2. The system of claim 1, the one or more hardware processors to execute the computer-executable instructions to:

determine narration audio data based on the narration script;

determine intro data using a fourth set of prompts, the segment data, and the input data as input to the first set of ML models;

determine teaser data using a fifth set of prompts, the segment data, and the input data as input to the first set of ML models;

determine recap detail data using a sixth set of prompts, the segment data, and the input data as input to the first set of ML models;

determine outro data using a seventh set of prompts, the segment data, and the input data as input to the first set of ML models;

determine mixed audio data based at least in part on the input data, wherein the mixed audio data comprises the narration audio data;

determine candidate recap data based on the intro data, the teaser data, the recap detail data, and the outro data; and determine the candidate recap data complies with validation guideline data using an eighth set of prompts, the candidate recap data, and the validation guideline data as input to the first set of ML models, wherein the recap data comprises the candidate recap data.

3. The system of claim 1, the one or more hardware processors to execute the computer-executable instructions to:

determine, based on the narration script, input text that is indicative of one of: an introductory portion of the narration script or a concluding portion of the narration script;

determine text storyboard data using a fourth set of prompts, the input text, and the summary data as inputs to the first set of ML models;

determine a set of video clip data using a fifth set of prompts, the text storyboard data, the DTD, and the input data as inputs to the first set of ML models;

determine a set of localized video data using a sixth set of prompts and the set of video clip data as inputs to the first set of ML models;

determine a set of selected video data using a seventh set of prompts and the set of localized video data as inputs to the first set of ML models; and determine a portion of the recap data based on the set of selected video data.

4. The system of claim 1, the one or more hardware processors to execute the computer-executable instructions to:

determine, based on the narration script, input text that is indicative of a teaser portion of the narration script;

determine genre data indicative of a genre of the input data;

determine rhythmic pattern data indicative of a timing pattern that is associated with the recap data;

determine teaser plan data using a fourth set of prompts, the input text, the summary data, the genre data, and the rhythmic pattern data as inputs to the first set of ML models;

determine a set of caption candidate data using a fifth set of prompts, the teaser plan data, and the DTD as inputs to the first set of ML models, wherein each instance of caption candidate data in the set of caption candidate data comprises a text description of a portion of the teaser portion;

determine a set of video clip data using a sixth set of prompts, the set of caption candidate data and the input data as inputs to the first set of ML models;

determine a set of localized video data using a seventh set of prompts and the set of video clip data as inputs to the first set of ML models;

determine a set of selected video data using an eighth set of prompts and the set of localized video data as inputs to the first set of ML models; and determine a portion of the recap data based on the set of selected video data.

5. The system of claim 1, the one or more hardware processors to execute the computer-executable instructions to:

determine a set of video clip data using a fourth set of prompts, the segment data, and the input data as inputs to the first set of ML models;

determine a set of localized video data using a fifth set of prompts and the set of video clip data as inputs to the first set of ML models;

determine a set of selected video data using a sixth set of prompts and the set of localized video data as inputs to the first set of ML models; and determine a portion of the recap data based on the set of selected video data.

6. The system of claim 1, the one or more hardware processors to execute the computer-executable instructions to:

determine input text based on one or more of the segment data or the narration script;

determine a first set of video data using a fourth set of prompts, the input text, the segment data, and the input data as inputs to the first set of ML models, wherein the first set of video data comprises a plurality of clips of video that are associated with a respective segment of the segment data;

determine a second set of video data using a fifth set of prompts, the input text, the segment data, and the input data as inputs to the first set of ML models, wherein the second set of video data comprises a single clip of video that is associated with a respective segment of the segment data;

determine a third set of video data using a sixth set of prompts, the input text, the segment data, and the input data as inputs to the first set of ML models, wherein the third set of video data comprises one or more video clips that are abstractly associated with a respective segment of the segment data; and determine a set of video clip data using a seventh set of prompts and the first set of video data, the second set of video data, and the third set of video data as inputs to the first set of ML models, wherein the set of video clip data comprises a subset of a set comprising the first, second, and third sets of video data; and wherein the recap data comprises the set of video clip data.

7. The system of claim 1, the one or more hardware processors to execute the computer-executable instructions to:

determine first video clip data having a first duration;

determine a set of cropped video data based on a first instance of video clip data, wherein each instance of the set of cropped video data comprises:

a respective start time and a respective end time, and a respective duration that is less than the first duration;

determine a set of localized video data using a fourth set of prompts and the set of cropped video data as inputs to the first set of ML models, wherein the set of localized video data comprises a subset of the set of cropped video data; and wherein the recap data comprises the set of localized video data.

8. The system of claim 1, the one or more hardware processors to execute the computer-executable instructions to:

determine a set of localized video data, wherein each instance of localized video data in the set of localized video data is associated with a portion of the segment data;

determine input text based on one or more of the segment data or the narration script;

determine a set of selected video data using a fourth set of prompts and the set of localized video data as inputs to the first set of ML models, wherein the set of selected video data comprises a subset of the set of localized video data; and wherein the recap data comprises the set of selected video data.

9. The system of claim 1, the one or more hardware processors to execute the computer-executable instructions to:

determine input text based on one or more of the segment data or the narration script;

determine boundary data indicative of a start time and an end time of a portion of the input data that is associated with an uninterrupted interval of time with respect to the input data;

determine a first set of candidate dialog text using a fourth set of prompts, the input text, the boundary data, the dense text data, the summary data, and the input data as inputs to the first set of ML models, wherein each instance of candidate dialog text in the first set of candidate dialog text comprises text that is associated with the portion;

determine a first set of candidate dialog video using a fifth set of prompts, the first set of candidate dialog text, the boundary data, and the input data as inputs to the first set of ML models, wherein each instance of candidate dialog video in the first set of candidate dialog video comprises video that is associated with the portion; and determine dialog video using a sixth set of prompts, the first set of candidate dialog video, and the input text as inputs to the first set of ML models.

10. The system of claim 1, the one or more hardware processors to execute the computer-executable instructions to:

determine first video clip data having a first duration, wherein the first video clip data comprises audio data;

determine localized audio data using a fourth set of prompts and the first video clip data as inputs to the first set of ML models, wherein the localized audio data has a second duration that is less than the first duration;

determine a transition effect from a plurality of transition effects; and generate extracted audio data based on applying the transition effect to the localized audio data.

11. A computer-implemented method comprising:

determining input data comprising video data with associated audio data;

determining dense text data (DTD) that is associated with the input data, wherein the DTD comprises text data that is indicative of one or more of: dialog, speaker annotation indicative of who uttered dialog, people, action, event, or setting;

determining summary data that is associated with the input data, wherein the summary data summarizes a portion of the input data;

determining a narration script using a first set of prompts, the summary data, and at least a portion of the DTD as input to a first set of machine learning (ML) models;

determining segment data using a second set of prompts and the narration script as input to the first set of ML models; and determining recap data using a third set of prompts, the segment data, and the input data as input to the first set of ML models, wherein the recap data comprises audio and video.

12. The method of claim 11, further comprising:

determining narration audio data based on the narration script;

determining intro data using a fourth set of prompts, the segment data, and the input data as input to the first set of ML models;

determining teaser data using a fifth set of prompts, the segment data, and the input data as input to the first set of ML models;

determining recap detail data using a sixth set of prompts, the segment data, and the input data as input to the first set of ML models;

determining outro data using a seventh set of prompts, the segment data, and the input data as input to the first set of ML models;

determining mixed audio data based at least in part on the input data, wherein the mixed audio data comprises the narration audio data;

determining candidate recap data based on the intro data, the teaser data, the recap detail data, and the outro data; and determining the candidate recap data complies with validation guideline data using an eighth set of prompts, the candidate recap data, and the validation guideline data as input to the first set of ML models, wherein the recap data comprises the candidate recap data.

13. The method of claim 11, further comprising:

determining, based on the narration script, input text that is indicative of one of: an introductory portion of the narration script or a concluding portion of the narration script;

determining text storyboard data using a fourth set of prompts, the input text, and the summary data as inputs to the first set of ML models;

determining a set of video clip data using a fifth set of prompts, the text storyboard data, the DTD, and the input data as inputs to the first set of ML models;

determining a set of localized video data using a sixth set of prompts and the set of video clip data as inputs to the first set of ML models;

determining a set of selected video data using a seventh set of prompts and the set of localized video data as inputs to the first set of ML models; and determining a portion of the recap data based on the set of selected video data.

14. The method of claim 11, further comprising:

determining, based on the narration script, input text that is indicative of a teaser portion of the narration script;

determining genre data indicative of a genre of the input data;

determining rhythmic pattern data indicative of a timing pattern that is associated with the recap data;

determining teaser plan data using a fourth set of prompts, the input text, the summary data, the genre data, and the rhythmic pattern data as inputs to the first set of ML models;

determining a set of caption candidate data using a fifth set of prompts, the teaser plan data, and the DTD as inputs to the first set of ML models, wherein each instance of caption candidate data in the set of caption candidate data comprises a text description of a portion of the teaser portion;

determining a set of video clip data using a sixth set of prompts, the set of caption candidate data and the input data as inputs to the first set of ML models;

determining a set of localized video data using a seventh set of prompts and the set of video clip data as inputs to the first set of ML models;

determining a set of selected video data using an eighth set of prompts and the set of localized video data as inputs to the first set of ML models; and determining a portion of the recap data based on the set of selected video data.

15. The method of claim 11, further comprising:

determining a set of video clip data using a fourth set of prompts, the segment data, and the input data as inputs to the first set of ML models;

determining a set of localized video data using a fifth set of prompts and the set of video clip data as inputs to the first set of ML models;

determining a set of selected video data using a sixth set of prompts and the set of localized video data as inputs to the first set of ML models; and determining a portion of the recap data based on the set of selected video data.

16. The method of claim 11, further comprising:

determining input text based on one or more of the segment data or the narration script;

determining a first set of video data using a fourth set of prompts, the input text, the segment data, and the input data as inputs to the first set of ML models, wherein the first set of video data comprises a plurality of clips of video that are associated with a respective segment of the segment data;

determining a second set of video data using a fifth set of prompts, the input text, the segment data, and the input data as inputs to the first set of ML models, wherein the second set of video data comprises a single clip of video that is associated with a respective segment of the segment data;

determining a third set of video data using a sixth set of prompts, the input text, the segment data, and the input data as inputs to the first set of ML models, wherein the third set of video data comprises one or more video clips that are abstractly associated with a respective segment of the segment data; and determining a set of video clip data using a seventh set of prompts and the first set of video data, the second set of video data, and the third set of video data as inputs to the first set of ML models, wherein the set of video clip data comprises a subset of a set comprising the first, second, and third sets of video data; and wherein the recap data comprises the set of video clip data.

17. The method of claim 11, further comprising:

determining first video clip data having a first duration;

determining a set of cropped video data based on a first instance of video clip data, wherein each instance of the set of cropped video data comprises:

a respective start time and a respective end time, and a respective duration that is less than the first duration;

determining a set of localized video data using a fourth set of prompts and the set of cropped video data as inputs to the first set of ML models, wherein the set of localized video data comprises a subset of the set of cropped video data; and wherein the recap data comprises the set of localized video data.

18. The method of claim 11, further comprising:

determining a set of localized video data, wherein each instance of localized video data in the set of localized video data is associated with a portion of the segment data;

determining input text based on one or more of the segment data or the narration script;

determining a set of selected video data using a fourth set of prompts and the set of localized video data as inputs to the first set of ML models, wherein the set of selected video data comprises a subset of the set of localized video data; and wherein the recap data comprises the set of selected video data.

19. The method of claim 11, further comprising:

determining input text based on one or more of the segment data or the narration script;

determining boundary data indicative of a start time and an end time of a portion of the input data that is associated with an uninterrupted interval of time with respect to the input data;

determining a first set of candidate dialog text using a fourth set of prompts, the input text, the boundary data, the dense text data, the summary data, and the input data as inputs to the first set of ML models, wherein each instance of candidate dialog text in the first set of candidate dialog text comprises text that is associated with the portion;

determining a first set of candidate dialog video using a fifth set of prompts, the first set of candidate dialog text, the boundary data, and the input data as inputs to the first set of ML models, wherein each instance of candidate dialog video in the first set of candidate dialog video comprises video that is associated with the portion; and determining dialog video using a sixth set of prompts, the first set of candidate dialog video, and the input text as inputs to the first set of ML models.

20. The method of claim 11, further comprising:

determining first video clip data having a first duration, wherein the first video clip data comprises audio data;

determining localized audio data using a fourth set of prompts and the first video clip data as inputs to the first set of ML models, wherein the localized audio data has a second duration that is less than the first duration;

determining a transition effect from a plurality of transition effects; and generating extracted audio data based on applying the transition effect to the localized audio data.

* * * * *